(12) United States Patent
Ionita et al.

(10) Patent No.: US 8,509,561 B2
(45) Date of Patent: Aug. 13, 2013

(54) SEPARATING DIRECTIONAL LIGHTING VARIABILITY IN STATISTICAL FACE MODELLING BASED ON TEXTURE SPACE DECOMPOSITION

(75) Inventors: Mircea Ionita, Galway (IE); Peter Corcoran, Claregalway (IE); Ioana Bacivarov, Galway (IE)

(73) Assignees: DigitalOptics Corporation Europe Limited, Galway (IE); National University of Ireland, Galway (IE)

( * ) Notice: Subject to any disclaimer, the term of this patent is extended or adjusted under 35 U.S.C. 154(b) by 1444 days.

(21) Appl. No.: 12/038,147

(22) Filed: Feb. 27, 2008

(65) Prior Publication Data

US 2008/0205712 A1    Aug. 28, 2008

Related U.S. Application Data

(60) Provisional application No. 60/892,238, filed on Feb. 28, 2007.

(51) Int. Cl.
*G06K 9/40* (2006.01)
*G06K 9/62* (2006.01)

(52) U.S. Cl.
USPC .......... 382/274; 382/155; 382/156; 382/159; 382/254

(58) Field of Classification Search
USPC .................. 382/254, 275, 299, 274, 155–160
See application file for complete search history.

(56) References Cited

U.S. PATENT DOCUMENTS

| 4,047,187 A | 9/1977 | Mashimo et al. |
| 4,317,991 A | 3/1982 | Stauffer |
| 4,367,027 A | 1/1983 | Stauffer |
| RE31,370 E | 9/1983 | Mashimo et al. |

(Continued)

FOREIGN PATENT DOCUMENTS

| EP | 1 128 316 A | 8/2001 |
| EP | 1626569 A1 | 2/2006 |

(Continued)

OTHER PUBLICATIONS

Notification of the International Search Report and the Written Opinion of the International Searching Authority, or the Declaration, for PCT Application No. PCT/EP2008/052329, dated Sep. 15, 2008, 12 pages.

(Continued)

*Primary Examiner* — Anand Bhatnagar
*Assistant Examiner* — Soo Park
(74) *Attorney, Agent, or Firm* — Andrew V. Smith

(57) ABSTRACT

A technique for determining a characteristic of a face or certain other object within a scene captured in a digital image including acquiring an image and applying a linear texture model that is constructed based on a training data set and that includes a class of objects including a first subset of model components that exhibit a dependency on directional lighting variations and a second subset of model components which are independent of directional lighting variations. A fit of the model to the face or certain other object is obtained including adjusting one or more individual values of one or more of the model components of the linear texture model. Based on the obtained fit of the model to the face or certain other object in the scene, a characteristic of the face or certain other object is determined.

68 Claims, 3 Drawing Sheets

(56) References Cited

U.S. PATENT DOCUMENTS

| | | |
|---|---|---|
| 4,448,510 A | 5/1984 | Murakoshi |
| 4,456,354 A | 6/1984 | Mizokami |
| 4,638,364 A | 1/1987 | Hiramatsu |
| 4,690,536 A | 9/1987 | Nakai et al. |
| 4,796,043 A | 1/1989 | Izumi et al. |
| 4,970,663 A | 11/1990 | Bedell et al. |
| 4,970,683 A | 11/1990 | Harshaw et al. |
| 4,975,969 A | 12/1990 | Tal |
| 5,008,946 A | 4/1991 | Ando |
| 5,018,017 A | 5/1991 | Sasaki et al. |
| RE33,682 E | 9/1991 | Hiramatsu |
| 5,051,770 A | 9/1991 | Cornuejols |
| 5,063,603 A | 11/1991 | Burt |
| 5,111,231 A | 5/1992 | Tokunaga |
| 5,150,432 A | 9/1992 | Ueno et al. |
| 5,161,204 A | 11/1992 | Hutcheson et al. |
| 5,164,831 A | 11/1992 | Kuchta et al. |
| 5,164,992 A | 11/1992 | Turk et al. |
| 5,227,837 A | 7/1993 | Terashita |
| 5,280,530 A | 1/1994 | Trew et al. |
| 5,291,234 A | 3/1994 | Shindo et al. |
| 5,305,048 A | 4/1994 | Suzuki et al. |
| 5,311,240 A | 5/1994 | Wheeler |
| 5,331,544 A | 7/1994 | Lu et al. |
| 5,353,058 A | 10/1994 | Takei |
| 5,384,615 A | 1/1995 | Hsieh et al. |
| 5,384,912 A | 1/1995 | Ogrinc et al. |
| 5,430,809 A | 7/1995 | Tomitaka |
| 5,432,863 A | 7/1995 | Benati et al. |
| 5,450,504 A | 9/1995 | Calia |
| 5,465,308 A | 11/1995 | Hutcheson et al. |
| 5,488,429 A | 1/1996 | Kojima et al. |
| 5,493,409 A | 2/1996 | Maeda et al. |
| 5,496,106 A | 3/1996 | Anderson |
| 5,572,596 A | 11/1996 | Wildes et al. |
| 5,576,759 A | 11/1996 | Kawamura et al. |
| 5,633,678 A | 5/1997 | Parulski et al. |
| 5,638,136 A | 6/1997 | Kojima et al. |
| 5,638,139 A | 6/1997 | Clatanoff et al. |
| 5,652,669 A | 7/1997 | Liedenbaum |
| 5,680,481 A | 10/1997 | Prasad et al. |
| 5,684,509 A | 11/1997 | Hatanaka et al. |
| 5,706,362 A | 1/1998 | Yabe |
| 5,710,833 A | 1/1998 | Moghaddam et al. |
| 5,715,325 A | 2/1998 | Bang et al. |
| 5,724,456 A | 3/1998 | Boyack et al. |
| 5,745,668 A | 4/1998 | Poggio et al. |
| 5,764,803 A | 6/1998 | Jacquin et al. |
| 5,771,307 A | 6/1998 | Lu et al. |
| 5,774,129 A | 6/1998 | Poggio et al. |
| 5,774,591 A | 6/1998 | Black et al. |
| 5,774,747 A | 6/1998 | Ishihara et al. |
| 5,774,754 A | 6/1998 | Ootsuka |
| 5,781,650 A | 7/1998 | Lobo et al. |
| 5,802,208 A | 9/1998 | Podilchuk et al. |
| 5,802,220 A | 9/1998 | Black et al. |
| 5,812,193 A | 9/1998 | Tomitaka et al. |
| 5,818,975 A | 10/1998 | Goodwin et al. |
| 5,835,616 A | 11/1998 | Lobo et al. |
| 5,842,194 A | 11/1998 | Arbuckle |
| 5,844,573 A | 12/1998 | Poggio et al. |
| 5,850,470 A | 12/1998 | Kung et al. |
| 5,852,669 A | 12/1998 | Eleftheriadis et al. |
| 5,852,823 A | 12/1998 | De Bonet |
| RE36,041 E | 1/1999 | Turk et al. |
| 5,870,138 A | 2/1999 | Smith et al. |
| 5,905,807 A | 5/1999 | Kado et al. |
| 5,911,139 A | 6/1999 | Jain et al. |
| 5,966,549 A | 10/1999 | Hara et al. |
| 5,978,519 A | 11/1999 | Bollman et al. |
| 5,991,456 A | 11/1999 | Rahman et al. |
| 6,028,960 A | 2/2000 | Graf et al. |
| 6,035,074 A | 3/2000 | Fujimoto et al. |
| 6,053,268 A | 4/2000 | Yamada |
| 6,061,055 A | 5/2000 | Marks |
| 6,072,094 A | 6/2000 | Karady et al. |
| 6,072,903 A | 6/2000 | Maki et al. |
| 6,097,470 A | 8/2000 | Buhr et al. |
| 6,101,271 A | 8/2000 | Yamashita et al. |
| 6,108,437 A | 8/2000 | Lin |
| 6,128,397 A | 10/2000 | Baluja et al. |
| 6,128,398 A | 10/2000 | Kuperstein et al. |
| 6,134,339 A | 10/2000 | Luo |
| 6,148,092 A | 11/2000 | Qian |
| 6,151,073 A | 11/2000 | Steinberg et al. |
| 6,173,068 B1 | 1/2001 | Prokoski |
| 6,188,777 B1 | 2/2001 | Darrell et al. |
| 6,192,149 B1 | 2/2001 | Eschbach et al. |
| 6,246,779 B1 | 6/2001 | Fukui et al. |
| 6,246,790 B1 | 6/2001 | Huang et al. |
| 6,249,315 B1 | 6/2001 | Holm |
| 6,252,976 B1 | 6/2001 | Schildkraut et al. |
| 6,263,113 B1 | 7/2001 | Abdel-Mottaleb et al. |
| 6,268,939 B1 | 7/2001 | Klassen et al. |
| 6,278,491 B1 | 8/2001 | Wang et al. |
| 6,282,317 B1 | 8/2001 | Luo et al. |
| 6,301,370 B1 | 10/2001 | Steffens et al. |
| 6,301,440 B1 | 10/2001 | Bolle et al. |
| 6,332,033 B1 | 12/2001 | Qian |
| 6,349,373 B2 | 2/2002 | Sitka et al. |
| 6,351,556 B1 | 2/2002 | Loui et al. |
| 6,393,148 B1 | 5/2002 | Bhaskar |
| 6,400,830 B1 | 6/2002 | Christian et al. |
| 6,404,900 B1 | 6/2002 | Qian et al. |
| 6,407,777 B1 | 6/2002 | DeLuca |
| 6,421,468 B1 | 7/2002 | Ratnakar et al. |
| 6,426,779 B1 | 7/2002 | Noguchi et al. |
| 6,438,234 B1 | 8/2002 | Gisin et al. |
| 6,438,264 B1 | 8/2002 | Gallagher et al. |
| 6,456,732 B1 | 9/2002 | Kimbell et al. |
| 6,456,737 B1 | 9/2002 | Woodfill et al. |
| 6,459,436 B1 | 10/2002 | Kumada et al. |
| 6,463,163 B1 | 10/2002 | Kresch |
| 6,473,199 B1 | 10/2002 | Gilman et al. |
| 6,501,857 B1 | 12/2002 | Gotsman et al. |
| 6,502,107 B1 | 12/2002 | Nishida |
| 6,504,942 B1 | 1/2003 | Hong et al. |
| 6,504,951 B1 | 1/2003 | Luo et al. |
| 6,516,154 B1 | 2/2003 | Parulski et al. |
| 6,526,161 B1 | 2/2003 | Yan |
| 6,529,630 B1 | 3/2003 | Kinjo |
| 6,549,641 B2 | 4/2003 | Ishikawa et al. |
| 6,556,708 B1 | 4/2003 | Christian et al. |
| 6,564,225 B1 | 5/2003 | Brogliatti et al. |
| 6,567,983 B1 | 5/2003 | Shiimori |
| 6,587,119 B1 | 7/2003 | Anderson et al. |
| 6,606,398 B2 | 8/2003 | Cooper |
| 6,633,655 B1 | 10/2003 | Hong et al. |
| 6,661,907 B2 | 12/2003 | Ho et al. |
| 6,697,503 B2 | 2/2004 | Matsuo et al. |
| 6,697,504 B2 | 2/2004 | Tsai |
| 6,700,999 B1 | 3/2004 | Yang |
| 6,747,690 B2 | 6/2004 | Molgaard |
| 6,754,368 B1 | 6/2004 | Cohen |
| 6,754,389 B1 | 6/2004 | Dimitrova et al. |
| 6,760,465 B2 | 7/2004 | McVeigh et al. |
| 6,760,485 B1 | 7/2004 | Gilman et al. |
| 6,765,612 B1 | 7/2004 | Anderson et al. |
| 6,778,216 B1 | 8/2004 | Lin |
| 6,792,135 B1 | 9/2004 | Toyama |
| 6,801,250 B1 | 10/2004 | Miyashita |
| 6,816,611 B1 | 11/2004 | Hagiwara et al. |
| 6,829,009 B2 | 12/2004 | Sugimoto |
| 6,850,274 B1 | 2/2005 | Silverbrook et al. |
| 6,876,755 B1 | 4/2005 | Taylor et al. |
| 6,879,705 B1 | 4/2005 | Tao et al. |
| 6,885,760 B1 | 4/2005 | Yamada et al. |
| 6,900,840 B1 | 5/2005 | Schinner et al. |
| 6,920,283 B2 | 7/2005 | Goldstein |
| 6,937,773 B1 | 8/2005 | Nozawa et al. |
| 6,940,545 B1 | 9/2005 | Ray et al. |
| 6,959,109 B2 | 10/2005 | Moustafa |
| 6,965,684 B2 | 11/2005 | Chen et al. |
| 6,977,687 B1 | 12/2005 | Suh |

| | | | | | | |
|---|---|---|---|---|---|---|
| 6,993,157 | B1 | 1/2006 | Oue et al. | 2003/0052991 A1 | 3/2003 | Stavely et al. |
| 7,003,135 | B2 | 2/2006 | Hsieh et al. | 2003/0059107 A1 | 3/2003 | Sun et al. |
| 7,020,337 | B2 | 3/2006 | Viola et al. | 2003/0059121 A1 | 3/2003 | Savakis et al. |
| 7,027,619 | B2 | 4/2006 | Pavlidis et al. | 2003/0068100 A1 | 4/2003 | Covell et al. |
| 7,027,621 | B1 | 4/2006 | Prokoski | 2003/0071908 A1 | 4/2003 | Sannoh et al. |
| 7,034,848 | B2 | 4/2006 | Sobol | 2003/0084065 A1 | 5/2003 | Lin et al. |
| 7,035,456 | B2 | 4/2006 | Lestideau | 2003/0107649 A1 | 6/2003 | Flickner et al. |
| 7,035,462 | B2 | 4/2006 | White et al. | 2003/0118216 A1 | 6/2003 | Goldberg |
| 7,035,467 | B2 | 4/2006 | Nicponski | 2003/0123713 A1 | 7/2003 | Geng |
| 7,038,709 | B1 | 5/2006 | Verghese | 2003/0123751 A1 | 7/2003 | Krishnamurthy et al. |
| 7,038,715 | B1 | 5/2006 | Flinchbaugh | 2003/0142209 A1 | 7/2003 | Yamazaki et al. |
| 7,039,222 | B2 | 5/2006 | Simon et al. | 2003/0151674 A1 | 8/2003 | Lin |
| 7,042,511 | B2 | 5/2006 | Lin | 2003/0160879 A1 | 8/2003 | Robbins et al. |
| 7,043,465 | B2 | 5/2006 | Pirim | 2003/0169907 A1 | 9/2003 | Edwards et al. |
| 7,050,607 | B2 | 5/2006 | Li et al. | 2003/0190090 A1 | 10/2003 | Beeman et al. |
| 7,057,653 | B1 | 6/2006 | Kubo | 2003/0202715 A1 | 10/2003 | Kinjo |
| 7,064,776 | B2 | 6/2006 | Sumi et al. | 2004/0022435 A1 | 2/2004 | Ishida |
| 7,082,212 | B2 | 7/2006 | Liu et al. | 2004/0088272 A1 | 5/2004 | Jojic et al. |
| 7,099,510 | B2 | 8/2006 | Jones et al. | 2004/0095359 A1 | 5/2004 | Simon et al. |
| 7,106,374 | B1 | 9/2006 | Bandera et al. | 2004/0120391 A1 | 6/2004 | Lin et al. |
| 7,106,887 | B2 | 9/2006 | Kinjo | 2004/0120399 A1 | 6/2004 | Kato |
| 7,110,569 | B2 | 9/2006 | Brodsky et al. | 2004/0170397 A1 | 9/2004 | Ono |
| 7,110,575 | B2 | 9/2006 | Chen et al. | 2004/0175021 A1 | 9/2004 | Porter et al. |
| 7,113,641 | B1 | 9/2006 | Eckes et al. | 2004/0179719 A1 | 9/2004 | Chen et al. |
| 7,119,838 | B2 | 10/2006 | Zanzucchi et al. | 2004/0197013 A1 | 10/2004 | Kamei |
| 7,120,279 | B2 | 10/2006 | Chen et al. | 2004/0213482 A1 | 10/2004 | Silverbrook |
| 7,151,843 | B2 | 12/2006 | Rui et al. | 2004/0218832 A1 | 11/2004 | Luo et al. |
| 7,158,680 | B2 | 1/2007 | Pace | 2004/0223629 A1 | 11/2004 | Chang |
| 7,162,076 | B2 | 1/2007 | Liu | 2004/0223649 A1 | 11/2004 | Zacks et al. |
| 7,162,101 | B2 | 1/2007 | Itokawa et al. | 2004/0228505 A1 | 11/2004 | Sugimoto |
| 7,171,023 | B2 | 1/2007 | Kim et al. | 2004/0264744 A1 | 12/2004 | Zhang et al. |
| 7,171,025 | B2 | 1/2007 | Rui et al. | 2005/0013479 A1 | 1/2005 | Xiao et al. |
| 7,190,829 | B2 | 3/2007 | Zhang et al. | 2005/0018925 A1 | 1/2005 | Bhagavatula et al. |
| 7,194,114 | B2 | 3/2007 | Schneiderman | 2005/0041121 A1 | 2/2005 | Steinberg et al. |
| 7,200,249 | B2 | 4/2007 | Okubo et al. | 2005/0068446 A1 | 3/2005 | Steinberg et al. |
| 7,218,759 | B1 | 5/2007 | Ho et al. | 2005/0068452 A1 | 3/2005 | Steinberg et al. |
| 7,227,976 | B1 | 6/2007 | Jung et al. | 2005/0069208 A1 | 3/2005 | Morisada |
| 7,254,257 | B2 | 8/2007 | Kim et al. | 2005/0089218 A1 | 4/2005 | Chiba |
| 7,269,292 | B2 | 9/2007 | Steinberg | 2005/0102246 A1 | 5/2005 | Movellan et al. |
| 7,274,822 | B2 | 9/2007 | Zhang et al. | 2005/0104848 A1 | 5/2005 | Yamaguchi et al. |
| 7,274,832 | B2 | 9/2007 | Nicponski | 2005/0105780 A1 | 5/2005 | Ioffe |
| 7,295,233 | B2 | 11/2007 | Steinberg et al. | 2005/0105805 A1* | 5/2005 | Nicponski .................... 382/216 |
| 7,315,630 | B2 | 1/2008 | Steinberg et al. | 2005/0140801 A1 | 6/2005 | Prilutsky et al. |
| 7,315,631 | B1 | 1/2008 | Corcoran et al. | 2005/0185054 A1 | 8/2005 | Edwards et al. |
| 7,317,815 | B2 | 1/2008 | Steinberg et al. | 2005/0275721 A1 | 12/2005 | Ishii |
| 7,336,821 | B2 | 2/2008 | Ciuc et al. | 2006/0006077 A1 | 1/2006 | Mosher et al. |
| 7,362,368 | B2 | 4/2008 | Steinberg et al. | 2006/0008152 A1 | 1/2006 | Kumar et al. |
| 7,403,643 | B2 | 7/2008 | Ianculescu et al. | 2006/0008173 A1 | 1/2006 | Matsugu et al. |
| 7,440,593 | B1 | 10/2008 | Steinberg et al. | 2006/0018517 A1 | 1/2006 | Chen et al. |
| 7,515,740 | B2 | 4/2009 | Corcoran et al. | 2006/0029265 A1 | 2/2006 | Kim et al. |
| 7,590,305 | B2 | 9/2009 | Steinberg et al. | 2006/0039690 A1 | 2/2006 | Steinberg et al. |
| 7,612,794 | B2 | 11/2009 | He et al. | 2006/0050933 A1 | 3/2006 | Adam et al. |
| 7,620,214 | B2 | 11/2009 | Chen et al. | 2006/0098875 A1 | 5/2006 | Sugimoto |
| 7,636,485 | B2 | 12/2009 | Simon et al. | 2006/0098890 A1 | 5/2006 | Steinberg et al. |
| 7,792,335 | B2 | 9/2010 | Steinberg et al. | 2006/0120599 A1 | 6/2006 | Steinberg et al. |
| 7,804,983 | B2 | 9/2010 | Steinberg et al. | 2006/0140455 A1 | 6/2006 | Costache et al. |
| 7,995,795 | B2 | 8/2011 | Steinberg et al. | 2006/0147192 A1 | 7/2006 | Zhang et al. |
| 8,005,268 | B2 | 8/2011 | Steinberg et al. | 2006/0177100 A1 | 8/2006 | Zhu et al. |
| 2001/0005222 | A1 | 6/2001 | Yamaguchi | 2006/0177131 A1 | 8/2006 | Porikli |
| 2001/0028731 | A1 | 10/2001 | Covell et al. | 2006/0203106 A1 | 9/2006 | Lawrence et al. |
| 2001/0031142 | A1 | 10/2001 | Whiteside | 2006/0203107 A1 | 9/2006 | Steinberg et al. |
| 2001/0038712 | A1 | 11/2001 | Masumoto et al. | 2006/0203108 A1 | 9/2006 | Steinberg et al. |
| 2001/0038714 | A1 | 11/2001 | Masumoto et al. | 2006/0204034 A1 | 9/2006 | Steinberg et al. |
| 2002/0105662 | A1 | 8/2002 | Patton et al. | 2006/0204054 A1 | 9/2006 | Steinberg et al. |
| 2002/0106114 | A1 | 8/2002 | Yan et al. | 2006/0204055 A1 | 9/2006 | Steinberg et al. |
| 2002/0114535 | A1 | 8/2002 | Luo | 2006/0204056 A1 | 9/2006 | Steinberg et al. |
| 2002/0118287 | A1 | 8/2002 | Grosvenor et al. | 2006/0204057 A1 | 9/2006 | Steinberg |
| 2002/0136433 | A1 | 9/2002 | Lin | 2006/0204058 A1 | 9/2006 | Kim et al. |
| 2002/0150662 | A1 | 10/2002 | Dewis et al. | 2006/0204110 A1 | 9/2006 | Steinberg et al. |
| 2002/0168108 | A1 | 11/2002 | Loui et al. | 2006/0210264 A1 | 9/2006 | Saga |
| 2002/0172419 | A1 | 11/2002 | Lin et al. | 2006/0215924 A1 | 9/2006 | Steinberg et al. |
| 2002/0176609 | A1 | 11/2002 | Hsieh et al. | 2006/0257047 A1 | 11/2006 | Kameyama et al. |
| 2002/0181801 | A1 | 12/2002 | Needham et al. | 2006/0268150 A1 | 11/2006 | Kameyama et al. |
| 2002/0191861 | A1 | 12/2002 | Cheatle | 2006/0269270 A1 | 11/2006 | Yoda et al. |
| 2003/0012414 | A1 | 1/2003 | Luo | 2006/0280380 A1 | 12/2006 | Li et al. |
| 2003/0023974 | A1 | 1/2003 | Dagtas et al. | 2006/0285754 A1 | 12/2006 | Steinberg et al. |
| 2003/0025812 | A1 | 2/2003 | Slatter | 2006/0291739 A1 | 12/2006 | Li et al. |
| 2003/0035573 | A1 | 2/2003 | Duta et al. | 2007/0018966 A1 | 1/2007 | Blythe et al. |
| 2003/0048950 | A1 | 3/2003 | Savakis et al. | 2007/0070440 A1 | 3/2007 | Li et al. |

| | | | |
|---|---|---|---|
| 2007/0071347 | A1 | 3/2007 | Li et al. |
| 2007/0091203 | A1 | 4/2007 | Peker et al. |
| 2007/0098303 | A1 | 5/2007 | Gallagher et al. |
| 2007/0110305 | A1 | 5/2007 | Corcoran et al. |
| 2007/0116379 | A1 | 5/2007 | Corcoran et al. |
| 2007/0116380 | A1 | 5/2007 | Ciuc et al. |
| 2007/0122056 | A1 | 5/2007 | Steinberg et al. |
| 2007/0133901 | A1 | 6/2007 | Aiso |
| 2007/0154095 | A1 | 7/2007 | Cao et al. |
| 2007/0154096 | A1 | 7/2007 | Cao et al. |
| 2007/0160307 | A1 | 7/2007 | Steinberg et al. |
| 2007/0189606 | A1 | 8/2007 | Ciuc et al. |
| 2007/0189748 | A1 | 8/2007 | Drimbarean et al. |
| 2007/0189757 | A1 | 8/2007 | Steinberg et al. |
| 2007/0201724 | A1 | 8/2007 | Steinberg et al. |
| 2007/0216777 | A1* | 9/2007 | Quan et al. .................. 348/222.1 |
| 2007/0296833 | A1 | 12/2007 | Corcoran et al. |
| 2008/0013798 | A1 | 1/2008 | Ionita et al. |
| 2008/0037827 | A1 | 2/2008 | Corcoran et al. |
| 2008/0037838 | A1 | 2/2008 | Ianculescu et al. |
| 2008/0037839 | A1 | 2/2008 | Corcoran et al. |
| 2008/0037840 | A1 | 2/2008 | Steinberg et al. |
| 2008/0043122 | A1 | 2/2008 | Steinberg et al. |
| 2008/0049970 | A1 | 2/2008 | Ciuc et al. |
| 2008/0055433 | A1 | 3/2008 | Steinberg et al. |
| 2008/0075385 | A1 | 3/2008 | David et al. |
| 2008/0144966 | A1 | 6/2008 | Steinberg et al. |
| 2008/0175481 | A1 | 7/2008 | Petrescu et al. |
| 2008/0240555 | A1 | 10/2008 | Nanu et al. |
| 2009/0003661 | A1 | 1/2009 | Ionita et al. |
| 2009/0052750 | A1 | 2/2009 | Steinberg et al. |
| 2009/0190803 | A1 | 7/2009 | Neghina et al. |
| 2011/0102553 | A1 | 5/2011 | Corcoran et al. |
| 2011/0279700 | A1 | 11/2011 | Steinberg et al. |
| 2011/0280446 | A1 | 11/2011 | Steinberg et al. |

FOREIGN PATENT DOCUMENTS

| | | |
|---|---|---|
| EP | 1748378 A | 1/2007 |
| EP | 1887511 A1 | 2/2008 |
| EP | 2115662 B1 | 6/2010 |
| GB | 2370438 A1 | 6/2002 |
| JP | 5260360 A2 | 10/1993 |
| JP | 2002-199202 A | 7/2002 |
| JP | 2005-003852 A | 1/2005 |
| JP | 2005-164475 A | 6/2005 |
| JP | 26005662 A2 | 1/2006 |
| JP | 26254358 A2 | 9/2006 |
| JP | 2006-318103 A | 11/2006 |
| JP | 2006-319534 A | 11/2006 |
| JP | 2006-319870 A | 11/2006 |
| JP | 2006-350498 A | 12/2006 |
| JP | 2007-006182 A | 11/2007 |
| WO | WO-02052835 A2 | 7/2002 |
| WO | 2007060980 A1 | 5/2007 |
| WO | 2007/097777 A1 | 8/2007 |
| WO | WO-2007095477 A2 | 8/2007 |
| WO | WO-2007095477 A3 | 8/2007 |
| WO | WO-2007095483 A2 | 8/2007 |
| WO | WO-2007095553 A2 | 8/2007 |
| WO | WO-2007095553 A3 | 8/2007 |
| WO | 2007/106117 A2 | 9/2007 |
| WO | 2007/106117 A3 | 12/2007 |
| WO | 2007/142621 A1 | 12/2007 |
| WO | 2008/015586 A2 | 2/2008 |
| WO | WO-2008018887 A1 | 2/2008 |
| WO | WO-2008023280 A2 | 2/2008 |
| WO | 2008/015586 A3 | 8/2008 |
| WO | 2008/104549 A2 | 9/2008 |
| WO | 2009095168 A1 | 8/2009 |

OTHER PUBLICATIONS

J. Buenaposada: Efficiently estimating 1-3,16 facial expression and illumination in appearance-based tracking, Proc. British Machine Vision Conference, [Online] Sep. 4, 2006, XP002494036, Retrieved from the Internet: URL:http://www.bmva.ac.uk/bmvc/2006/> [retrieved on Sep. 1, 2008].

S. Li and A. K. Jain (Eds.): "Handbook of face recognition" 2005, Springer, XP002494037 T. Cootes et al.—Chapter 3. "Modeling Facial Shape and Appearance".
Romdhani S et al., Identification by Fitting a 3D Morphable Model using linear Shape and Texture Error Functions, European Conference on Computer Vision, Berlin, DE, Jan. 1, 2002, pp. 1-15, XP003018283.
Aoki, H. et al., "An Image Storage System Using Complex-Valued Associative Memories, Abstract printed from http://csdl.computer.org/comp/proceedings/icpr/2000/0750/02/07502626abs.htm", International Conference on Pattern Recognition (ICRP '00), 2000, vol. 2.
Batur et al., "Adaptive Active Appearance Models", IEEE Transactions on Image Processing. 2005, pp. 1707-1721, vol. 14—Issue 11.
Beraldin, J.A. et al., "Object Model Creation from Multiple Range Images: Acquisition, Calibration, Model Building and Verification, Abstract printed from http://csdl.computer.org/comp/proceedings/nrc/1997/7943/00/7943032abs.htm". Intl Conf on Recent Adv in 3-D Digital Imaging and Modeling, 1997.
Beymer, David, "Pose-Invariant face Recognition Using Real and Virtual Views, A.I. Technical Report No. 1574". Massachusetts Institute of Technology Artificial Intelligence Laboratory, 1996, pp. 1-176.
Chang, T., "Texture Analysis and Classification with Tree-Structured Wavelet Transform", IEEE Transactions on Image Processing, 1993, pp. 429-441, vol. 2—Issue 4.
Cootes, T.F. and Taylor, C.J., "On representing edge structure for model matching", Proc. IEEE Computer Vision and Pattern Recognition, 2001, pp. 1114-1119.
Cootes, T.F. et al., "A comparative evaluation of active appearance model algorithms", Proc. 9th British Machine Vison Conference. British Machine Vision Association, 1998, pp. 680-689.
Crowley, J., "Multi-modal tracking of faces for video communication, http://citeseer.ist.psu.edu/crowley97multimodal.html", In Comp Vision and Patent Recog., 1997.
Dalton, J., "Digital Cameras and Electronic Color Image Acquisition, Abstract printed from http://csdl.computer.org/comp/proceedings/compcon/1996/7414/00/74140431abs.htm", C0MPC0N Spring '96—41st IEEE International Conference, 1996.
Donner, Rene et al., "Fast Active Appearance Model Search Using Canonical Correlation Analysis", IEEE Trans on Patt. Analysis and Machine Intell., 2006, pp. 1690-1694, vol. 28—Iss. 10.
Edwards, G.J. et al., "Advances in active appearance models", International Conference on Computer Vision (ICCV'99), 1999, pp. 137-142.
Edwards, G.J. et al., "Learning to identify and track faces in image sequences, Automatic Face and Gesture Recognition", IEEE Comput. Soc. 1998, pp. 260-265.
Feraud, R. et al., "A Fast and Accurate Face Detector Based on Neural Networks", IEEE Transactions on Pattern Analysis and Machine Intelligence, 2001, pp. 42-53, vol. 23—Issue 1.
Fernandez, A. et al., "Synthetic Elevation Beamforming and Image Acquisition Capabilities Using an 8x 128 1.75D Array, Abstract Printed from http://www.ieee-uffc.org/archive/uffc/trans/toc/abs/03/t0310040.htm", The Technical Institute of Electrical and Electronics Engineers.
Froba, B., "Face detection with the modified census transform", Proceedings of The Sixth IEEE International Conference on Automatic Face and Gesture Recognition, 2004, pp. 91-96.
Froba, B. et al., "Real time face detection, Kauai, Hawai Retrieved from the Internet:URL:http://www.embassi.de/publi/veroeffent/Froeba.pdf [retrieved on Oct. 23, 2007]", Dept. of Applied Electronics, Proc. "Signal and Image Processing", 2002, pp. 1-6.
Garnaoui, H.H. et al., "Visual Masking and the Design of Magnetic Resonance Image Acquisition, Abstract printed from http://csdl.computer.org/comp/proceedings/icip/1995/7310/01/73100625abs.htm", International Conference on Image Processing, 1995, vol. 1.
Gaubatz, M. et al., "Automatic Red-Eye Detection and Correction", IEEE ICIP, Proceedings 2002 International Conference on Image Processing, 2002, pp. 1-804-1-807, vol. 2—Issue 3.
Gerbrands, J., "On the Relationships Between SVD, KLT, and PCA", Pattern Recognition, 1981, pp. 375-381, vol. 14, Nos. 1-6.

Goodall, C., "Procrustes Methods in the Statistical Analysis of Shape, Stable URL: http://www.jstor.org/stable/2345744", Journal of the Royal Statistical Society. Series B (Methodological), 1991, pp. 285-339, vol. 53—Issue 2, Blackwell Publishing for the Royal Statistical Society.

Hou, XinWen et al., "Direct Appearance Models", IEEE, 2001, pp. 1-828-1-833.

Hu, W-C et al., "A Line String Image Representation for Image Storage and Retrieval, Abstract printed from http://csdl.computer.oro/comp/proceedings/icmcs/1997/7819/00/78190434abs.htm", International Conference on Multimedia Computing and Systems, 1997.

Huang et al., "Image Indexing Using Color Correlograms", Proceedings of the 1997 Conference on Computer Vision and Pattern Recognition (CVPR '97), 1997, pp. 762.

Huang, J. et al., "Detection of human faces using decision trees, http://doLieeecomputersociety.org/10.1109/Recognition", 2nd International Conference on Automatic Face and Gesture Recognition (FG '96), IEEE Xplore, 2001, p. 248.

Huber, R. et al., "Adaptive Aperture Control for Image Acquisition, Abstract printed from http://csdl.computer.org/comp/proceedings/wacv/2002/1858/00/18580320abs.htm. cited by other", Sixth IEEE Workshop on Applications of Computer Vision, 2002.

Jebara, T., "3D Pose Estimation and Normalization for Face Recognition, A Thesis submitted to the Faculty of Graduate Studies and Research in Partial fulfillment of the requirements of the degree of Bachelor of Engrg", Dept of Electrical Engineering, 1996, pp. 1-121, McGill University.

Jones, M and Viola, P., "Fast multi-view face detection, http://www.merl.com/papers/docs/TR2003-96.pdf", Mitsubishi Electric Rsrch Lab, 2003, 10 pgs.

Kang, S-B et al., "A Multibaseline Stereo System with Active Illumination and Real-Time Image Acquisition, Abstract printed from http://csdl.computer.org/comp/proceedings/iccv/1995/7042/00/70420088abs.htm", Fifth International Conference on Computer Vision, 1995.

Kita, N. et al., "Archiving Technology for Plant Inspection Images Captured by Mobile Active Cameras—4D Visible Memory, Abstract printed from http://csdl.computer.org/comp/proceedings/3dpvt/2002/1521/00/15210208abs.htm", 1st Intl Symp. on 3D Data Processing Visualization and Transmission (3DPVT '02), 2002.

Kouzani, A.Z., "Illumination-Effects Compensation in Facial Images Systems", Man and Cybernetics, IEEE SMC '99 Conference Proceedings, 1999, pp. VI-840-VI-844, vol. 6.

Kozubek, M. et al., "Automated Multi-view 3D Image Acquisition in Human Genome Research, Abstract printed from http://csdl.computer.org/comp/proceedings/3pvt/2002/1521/00/15210091abs.htm", 1st Intl Symp. on 3D Data Proc. Visualization and Transmission (3DPVT '02), 2002.

Krishnan, A., Panoramic Image Acquisition, 1996 Conference on Computer Vision and Pattern Recognition (CVPR '96), Jun. 18-20, 1996, San Francisco, CA, Abstract printed from http://csdl.computer.org/comp/proceedings/cvpr/1996/7258/00/72580379abs.htm.

Lai, J.H. et al., "Face recognition using holistic Fourier in variant features, http://digitalimaging.inf.brad.ac.uk/publication/pr34-1.pdf.", Patt. Rec., 2001, pp. 95-109, vol. 34.

Lei et al., "A CBIR Method Based on Color-Spatial Feature", IEEE 10th Ann. Int. Conf., 1999.

Lienhart, R. et al., "A Detector Tree of Boosted Classifiers for Real-Time Object Detection and Tracking", Proceedings of the 2003 International Conference on Multimedia and Expo, 2003, pp. 277-280, vol. 1, IEEE Computer Society.

Matkovic et al., "The 3D Wunderkammer an Indexing by Placing Approach to the Image Storage and Retrieval, Abstract printed from http://csdl.computer.org/comp/proceedings/tocg/2003/1942/00/19420034abs.htm", Theory and Practice of Comp. Graphics, 2003, Univ. of Birmingham.

Matthews, I. et al., "Active appearance models revisited, Retrieved from http://www.d.cmu.edu/pub_files/pub4/matthews_iain_2004_2/matthews_iain_2004_2.pdf", International Journal of Computer Vision, 2004, pp. 135-164, vol. 60—Issue 2.

Mekuz, N. et al., "Adaptive Step Size Window Matching for Detection", Proceedings of the 18th International Conference on Pattern Recognition, 2006, pp. 259-262, vol. 2.

Mitra, S. et al., "Gaussian Mixture Models Based on the Frequency Spectra for Human Identification and Illumination Classification", Proceedings of the Fourth IEEE Workshop on Automatic Identification Advanced Technologies, 2005, pp. 245-250.

Nordstrøm, M.M. et al., "The IMM face database an annotated dataset of 240 face images, http://www2.imm.dtu.dk/pubdb/p.php?3160", Informatics and Mathematical Modelling, 2004.

Ohta, Y-I et al., "Color Information for Region Segmentation, XP008026458", Computer Graphics and Image Processing, 1980, pp. 222-241, vol. 13—Issue 3, Academic Press.

Park et al., "Lenticular Stereoscopic Imaging and Displaying Techniques with no Special Glasses, Abstract printed from http://csdl.computer.org/comp/proceedings/icip/1995/7310/03/73103137abs.htm", International Conference on Image Processing, 1995, vol. 3.

PCT Application No. PCT/US2006/060392, filed Oct. 31, 2006, entitled "Digital Image Processing Using Face Detection and Skin Tone Information".

PCT Invitation to Pay Additional Fees and, Where Applicable Protest Fee, for PCT Application No. PCT/EP2008/001578, paper dated Jul. 8, 2008, 5 Pages.

PCT Notification of Transmittal of the International Search Report and the Written Opinion of the International Searching Authority, or the Declaration, for PCT Application No. PCT/US2006/021393, dated Mar. 29, 2007, 12 pages.

PCT Notification of Transmittal of the International Search Report and the Written Opinion of the International Searching Authority, or the Declaration, for PCT Application No. PCT/EP2007/006540, Nov. 8, 2007. 11 pgs.

PCT Notification of Transmittal of the International Search Report and the Written Opinion of the International Searching Authority, or the Declaration, for PCT Application No. PCT/EP2008/001510, dated May 29, 2008, 13 pages.

PCT Notification of Transmittal of the International Search Report and the Written Opinion of the International Searching Authority, or the Declaration, for PCT Application No. PCT/IB2007/003724, dated Aug. 28, 2008, 9 pages.

PCT Notification of Transmittal of the International Search Report and the Written Opinion of the International Searching Authority, or the Declaration, for PCT Application No. PCT/US2006/60392, 9 pages, dated Sep. 19, 2008.

PCT Notification of Transmittal of the International Search Report and the Written Opinion of the International Searching Authority, or the Declaration, for PCT Application No. PCT/EP2007/006540, Nov. 7, 2008, 6 pgs.

Rowley, H.A. et al., "Neural network-based face detection, ISSN: 0162-8828, DOI: 10.1109/34.655647, Posted online: Aug. 6, 2002. http://ieeexplore.ieee.org/xpl/freeabs_all.jsp?arnumber=655647andisnumber=14286", IEEE Transactions on Pattern Analysis and Machine Intelligence, 1998, pp. 23-38, vol. 2—Issue 1.

Ryu, H. et al., "Coarse-to-Fine Classification for Image-Based Face Detection", Image and video retrieval lecture notes in Computer science, 2006, pp. 291-299, vol. 4071, Springer-Verlag.

Shand, M., "Flexible Image Acquisition Using Reconfigurable Hardware, Abstract printed from http://csdl.computer.org/comp/proceedings/fccm/1995/7086/00/70860125abs.htm", IEEE Symposium of FPGA's for Custom Computing Machines (FCCM '95), 1995.

Sharma, G., "Digital color imaging, [Online]. Available: citeseer.ist.psu.edu/sharma97digital.html", IEEE Trans on Image Proc., 1997, pp. 901-932, vol. 6—Issue 7.

Shock, D. et al., "Comparison of Rural Remote Site Production of Digital Images Employing a film Digitizer or a Computed Radiography (CR) System, Abstract printed from http://csdl/computer.org/comp/proceedings/imac/1995/7560/00/75600071abs.htm", 4th International Conference on Image Management and Communication ( IMAC '95), 1995.

Sim, T. et al., "The CMU Pose, Illumination, and Expression (PIE) Database of Human Faces Robotics Institute, Tech. Report, CMU-RI-TR-01-02", 2001, 9 pages, Carnegie Mellon University.

Skocaj Danijel, "Range Image Acquisition of Objects with Non-Uniform Albedo Using Structured Light Range Sensor, Abstract printed from http://csdl.computer.org/comp/proceedings/icpr/2000/0750/01/07501778abs.htm", International Conference on Pattern Recognition (ICPR '00), 2000, vol. 1.
Smeraldi, F. et al., "Facial feature detection by saccadic exploration of the Gabor decomposition, XP010586874", Image Processing, ICIP 98. Proceedings International Conference on Chicago, IL, USA, IEEE Comput. Soc, 1998, pp. 163-167, vol. 3.
Soriano, M. et al., "Making Saturated Facial Images Useful Again, XP002325961, ISSN: 0277-786X", Proceedings of The Spie, 1999, pp. 113-121, vol. 3826.
Stegmann, M. B. et al., "A flexible appearance modelling environment, Available: http://www2.imm.dtu.dk/pubdb/p.php?1918", IEEE Transactions on Medical Imaging, 2003, pp. 1319-1331, vol. 22—Issue 10.
Stegmann, M.B. et al., "Multi-band modelling of appearance, XP009104697", Image and Vision Computing, 2003, pp. 61-67, vol. 21—Issue 1.
Stricker et al., "Similarity of color images", SPIE Proc, 1995, pp. 1-12, vol. 2420.
Sublett, J.W. et al., "Design and Implementation of a Digital Teleultrasound System for Real-Time Remote Diagnosis, Abstract printed from http://csdl.computer.org/comp/proceedings/cbms/1995/7117/00/71170292abs.htm", 8 Ann. IEEE Symp. on Comp-Based Medical Systems, 1995.
Tang, Yuan Y. et al., "Information Acquisition and Storage of Forms in Document Processing, Abstract printed from http://csdl.computer.org/comp/proceedings/icdar/1997/7898/00/78980170abs.htm", 4th Intl. Conf. Document Analysis and Recognition, 1997, vol. I and II.
Tjahyadi et al., "Application of the DCT Energy Histogram for Face Recognition", Proceedings of the 2nd International Conference on Information Technology for Application, 2004, pp. 305-310.
Tkalcic, M. and Tasic, J.F., "Colour spaces perceptual, historical and applicational background, ISBN: 0-7803-7763-X", IEEE, EUROCON, 2003, pp. 304-308, vol. I.
Turk, Matthew et al., "Eigenfaces for Recognition", Journal of Cognitive Neuroscience, 1991, 17 pgs, vol. 3—Issue I.
Twins Crack Face Recognition Puzzle, Internet article http://www.cnn.com/2003/TECH/ptech/03/10/israel.twins.reut/index.html, printed Mar. 10, 2003, 3 pages.
U.S. Appl. No. 11/554,539, filed Oct. 30, 2006, entitled Digital Image Processing Using Face Detection and Skin Tone Information.
Vuylsteke, P. et al., "Range Image Acquisition with a Single Binary-Encoded Light Pattern, abstract printed from http://csdl.computer.org/comp/trans/tp/1990/02/i0148abs.htm", IEEE Transactions on Pattern Analysis and Machine Intelligence, 1990, 1 page.
Wan, S.J. et al., "Variance-based color image quantization for frame buffer display", S. K. M. Wong Color Research and Application, 1990, pp. 52-58, vol. 15—Issue 1.
Yang, M-H. et al., "Detecting Faces in Images: A Survey, ISSN:0162-8828, http://portal.acm.org/citation.cfm?id=505621andcoll=GUIDEanddl=GUIDEandCFID=680-9268andCFTOKEN=82843223.", IEEE Transactions on Pattern Analysis and Machine Intelligence archive, 2002, pp. 34-58, vol. 24—Issue 1, IEEE Computer Society.
Zhang, J. et al., "Face Recognition: Eigenface, Elastic Matching, and Neural Nets", Proceedings of the IEEE, 1997, pp. 1423-1435, vol. 85—Issue 9.
Bradski Gary et al., "Learning-Based Computer Vision with Intel's Open Source Computer Vision Library", Intel Technology, 2005, pp. 119-130, vol. 9—Issue 2.
Corcoran, P. et al., "Automatic Indexing of Consumer Image Collections Using Person Recognition Techniques", Digest of Technical Papers. International Conference on Consumer Electronics, 2005, pp. 127-128.
Costache, G. et al., "In-Camera Person-Indexing of Digital Images", Digest of Technical Papers. International Conference on Consumer Electronics, 2006, pp. 339-340.
Demirkir, C. et al., "Face detection using boosted tree classifier stages", Proceedings of the IEEE 12th Signal Processing and Communications Applications Conference, 2004, pp. 575-578.
Drimbarean, A.F. et al., "Image Processing Techniques to Detect and Filter Objectionable Images based on Skin Tone and Shape Recognition", International Conference on Consumer Electronics, 2001, pp. 278-279.
Viola, P. et al., "Rapid Object Detection using a Boosted Cascade of Simple Features", Proceedings of the 2001 IEEE Computer Society Conference on Computer Vision and Pattern Recognition, 2001, pp. 1-511-1-518, vol. 1.
Viola, P. et al., "Robust Real-Time Face Detection", International Journal of Computer Vision, 2004, pp. 137-154, vol. 57—Issue 2. Kluwer Academic Publishers.
Xin He et al., "Real-Time Human Face Detection in Color Image", International Conference on Machine Learning and Cybernetics. 2003, pp. 2915-2920, vol. 5.
Zhao. W. et al., "Face recognition: A literature survey, ISSN: 0360-0300, http://portal.acm.org/citation.cfm?id=954342andcoll=GUIDEanddl=GUIDEandCFID=680-9268andCFTOKEN=82843223.", ACM Computing Surveys (CSUR) archive, 2003, pp. 399-458, vol. 35—issue 4, ACM Press.
Zhu Qiang et al., "Fast Human Detection Using a Cascade of Histograms of Oriented Gradients", Proceedings of the 2006 IEEE Computer Society Conference on Computer Vision and Pattern Recognition, 2006, pp. 1491-1498, IEEE Computer Society.
Final Office Action mailed Nov. 18, 2009, for U.S. Appl. No. 11/554,539, filed Oct. 30, 2006.
Non-Final Office Action mailed Aug 19, 2009, for U.S. Appl. No. 11/773,815, filed Jul. 5, 2007.
Non-Final Office Action mailed Aug 20, 2009, for U.S. Appl. No. 11/773,855, filed Jul. 5, 2007.
Non-Final Office Action mailed Jan. 20, 2010, for U.S. Appl. No. 12/262,024, filed Oct. 30, 2008.
Non-Final Office Action mailed Sep. 8, 2009, for U.S. Appl. No. 11/688,236, filed Mar. 19, 2007.
Notice of Allowance mailed Sep. 28, 2009, for U.S. Appl. No. 12/262,037, filed Oct. 30, 2008.
J. M. Buenaposada, E. Munoz, L. Baumela, Efficiently estimating facial expression and illumination in appearance-based tracking, Proc. British Machine Vision Conference 2006, the United Kingdom, The British Machine Vision Association, Sep. 4, 2006, pp. 1 to 10, URL:http://www.bmva.org/bmvc/2006/papersIV0lume.htm.
Non-final Rejection, dated Aug. 5, 2011, in co-pending U.S. Appl. No. 12/203,807, filed Sep. 3, 2008.
Patent Abstracts of Japan: Publication No. 2000-347277, Date of Publication: Dec. 12, 2000. For Camera and Method of Pick Up.
Huang W., et al., "Eye Tracking with Statistical Learning and Sequential Monte Carlo Sampling," Proceedings of the Fourth International Conference on Information, Communications & Signal Processing and Fourth IEEE Pacific-Rim Conference on Multimedia (ICICS-PCM2003), 2003, vol. 3, pp. 1873-1878.
Michael Chau, Margrit Betke, Real Time Eye Tracking and Blink Detection with USB Cameras, Boston University Computer Science Technical Report No. 2005-12, Computer Science Department, Boston University, Boston, MA 02215, US, May 12, 2005, 10 Pages.
Gorodnichy, D.: Second Order Change Detection, and its Application to Blink-Controlled Perceptual Interfaces, published in the Proceedings of the International Association of Science and Technology for Development {IASTED{ Conference on Visualization, Imaging and Image Processing (VIIP 2003). pp. 140-145. Benalmandena, Spain. Sep. 8-10, 2003.
Jack Tumblin, Amit Agrawal, Ramesh Raskar: Why I want a Gradient Camera, IEEE International Conference on Computer Vision and Pattern Recognition (CVPR), Dec. 2005, 10 Pages.
Yang, Ming-Hsuan et al., Detecting Faces in Images: A Survey, IEEE Transactions on Pattern Analysis and Machine Intelligence, vol. 24—Issue 1, Jan. 1, 2002, pp. 34-58, IEEE Computer Society ISSN:0162-8828, http://portal.acm.org/citation.cfm?id=505621 &coll=GUIDE&dl=GUIDE&CFID=680-9268 &CFTOKEN=82843223.
The extended European search report including pursuant to Rule 62 EPC, the Supplementary European search report (Art. 153(7) EPC) and the European search opinion, for European application No. 06789329.7, dated Jan. 22, 2009, 7 pages.
Co-pending U.S. Appl. No. 13/035,9007, filed Feb. 25, 2011.

Co-pending U.S. Appl. No. 13/219,569, filed Aug. 26, 2011.

T.F. Cootes, G. J. Edwards and C. J. Taylor, Active appearance models, ECCV'98, 1998, vol. 1407/1998, 484-498.

Notice of Allowance, dated Dec. 28, 2011, for U.S. Appl. No. 12/203,807, filed Sep. 3, 2008.

Patent Abstracts of Japan: Publication No. 2004-294498, Date of publication: Oct. 21, 2004. For Automatic Photographing System.

Patent Abstracts of Japan: Publication No. 2001-067459, Date of publication: Mar. 16, 2001. For Method and Device for Face Image Processing.

EPO Communication from the Examining Division, pursuant to Article 94(3) EPC, for European application No. 06789329.7. Report dated May 23, 2011. 5 Pages.

EPO Communication from the Examining Division, pursuant to Article 94(3) EPC, for European application No. 06789329.7. Report dated Jul. 31, 2009. 6 Pages.

Volker Blanz and Thomas Vetter, A Morphable Model for the Synthesis of 3D Faces, in Proceedings of the 26th annual conference on Computer graphics and interactive techniques, pp. 187-194, 1999.

Seth C. Koterba, Simon Baker, Iain Matthews, Changbo Hu, Jing Xiao, Jeffrey Cohn, and Takeo Kanade, Multi-View AAM Fitting and Camera Calibration, In Proc. International Conference on Computer Vision, Oct. 2005, pp. 511-518.

Luigi Di Stefano, Massimiliano Marchionni, and Stefano Mattoccia, A fast area-based stereo matching algorithm, Image and Vision Computing, 22 (2004) pp. 983-1005.

Jing Xiao, Simon Baker, Iain Matthews, and Takeo Kanade, Real-Time Combined 2D+3D Active Appearance Models, in Proceedings of the IEEE Conference on Computer Vision and Pattern Recognition (CVPR'04), pp. 535-542, 2004.

Changbo Hu, Jing Xiao, Iain Matthews, Simon Baker, Jeff Cohn, and Takeo Kanade, Fitting a Single Active Appearance Model Simultaneously to Multiple Images, in Proc. of the British Machine Vision Conference, Sep. 2004.

* cited by examiner

SEPARATING DIRECTIONAL LIGHTING VARIABILITY IN STATISTICAL FACE MODELLING BASED ON TEXTURE SPACE DECOMPOSITION

PRIORITY

This application claims the benefit of priority to U.S. provisional patent application No. 60/892,238, filed Feb. 28, 2007, which is incorporated by reference.

BACKGROUND

The appearance of an object can be represented by statistical models trained using a set of annotated image examples. This is thus highly dependent on the way in which the model is trained. A new image can be interpreted by finding the best plausible match of the model to the image data. While there has been a great deal of literature in computer vision detailing methods for handling statistical models for human faces, there still exist some problems wherein solutions are desired. For example, statistical models for human faces are sensitive to illumination changes, especially if lighting in the test image differs significantly from conditions learned from a training set. The appearance of a face can change dramatically as lighting conditions change. Due to the 3D aspect of the face, a direct lighting source can cast strong shadows and shading which affect certain facial features. Variations due to illumination changes can be even greater than variations between the faces of two different individuals.

Various methods have been proposed to overcome this challenge. A feature-based approach seeks to utilize features that are invariant to lighting variations. In C. Hu, R. Feris, and M. Turk, "Active wavelet networks for face alignment," in *Proc. of the British Machine Vision Conference*, East Eaglia, Norwich, UK, 2003, incorporated by reference, it is proposed to replace the AAM texture by an active wavelet network for face alignment, while in S. Le Gallou, G. Breton, C. Garcia, and R. S'eguier, "Distance maps: A robust illumination preprocessing for active appearance models," in *VISAPP '06, First International Conference on Computer Vision Theory and Applications*, Set'ubal, Portugal, 2006, vol. 2, pp. 35-40, incorporated by reference, texture is replaced by distance maps that are robust against lighting variations.

Other methods rely on removing illumination components using lighting models. The linear subspace approaches of S. Z. Li, R. Xiao, Z. Y Li, and H. J. Zhang, "Nonlinear mapping of multi-view face patterns to a Gaussian distribution in a low dimensional space," in *RATFG-RTS '01: Proceedings of the IEEE ICCV Workshop on Recognition, Analysis, and Tracking of Faces and Gestures in Real-Time Systems*, 2001, p. 47, and M. Bichsel, "Illumination invariant object recognition," in *ICIP '95: Proceedings of the 1995 International Conference on Image Processing—Vol.* 3, 1995, p. 3620, and P. N. Belhumeur, J. Hespanha, and D. J. Kriegman, "Eigenfaces vs. fisherfaces: Recognition using class specific linear projection," *IEEE Transactions on Pattern Analysis and Machine Intelligence*, vol. 19, no. 7, pp. 711-720, 1997, which are each incorporated by reference, approximate the human face surface with a Lambertian surface and compute a basis for a 3D illumination subspace, using images acquired under different lighting conditions.

The illumination convex cone goes a step further with the model, taking into account shadows and multiple lighting sources, as in P. N. Belhumeur and D. J. Kriegman, "What is the set of images of an object under all possible lighting conditions?," in *CVPR '96: Proceedings of the 1996 Conference on Computer Vision and Pattern Recognition*, 1996, p. 270, and A. S. Georghiades, D. J. Kriegman, and P. N. Belhumeur, "Illumination cones for recognition under variable lighting: Faces," in *CVPR '98: Proceedings of the IEEE Computer Society Conference on Computer Vision and Pattern Recognition*, 1998, p. 52, and A. S. Georghiades, P. N. Belhumeur, and D. J. Kriegman, "From few to many: Generative models for recognition under variable pose and illumination.," in *FG*, 2000, pp. 277-284, which are each incorporated by reference.

More complex models have been proposed like the geodesic illumination basis model of R. Ishiyama and S. Sakamoto, "Geodesic illumination basis: Compensating for illumination variations in any pose for face recognition.," in *ICPR* (4), 2002, pp. 297-301, incorporated by reference, or the 3D linear subspace model that segments the images into regions with directions of surface normals close to each other as in A. U. Batur and M. H. Hayes, "Linear subspaces for illumination robust face recognition.," in *CVPR* (2), 2001, pp. 296-301, incorporated by reference.

The canonical form approach appears as an alternative, where an attempt to normalize variations in appearance by image transformations or by synthesizing a new image from the given image in a normalized form is undertaken. Recognition is then performed using this canonical form as in W. Zhao, *Robust image based 3d face recognition*, Ph.D. thesis, 1999, Chair-Rama Chellappa.

[12] W. Gao, S. Shan, X. Chai, and X. Fu, "Virtual face image generation for illumination and pose insensitive face recognition," *ICME*, vol. 3, pp. 149-152, 2003, incorporated by reference.

In T. Shakunaga and K. Shigenari, "Decomposed eigenface for face recognition under various lighting conditions," *CVPR*, vol. 01, pp. 864, 2001, and T. Shakunaga, F. Sakaue, and K. Shigenari, "Robust face recognition by combining projection-based image correction and decomposed eigenface," 2004, pp. 241-247, which are incorporated by reference, decomposition of an eigenface into two orthogonal eigenspaces is proposed for realizing a general face recognition technique, under lighting changes. A somewhat similar approach is used in J. M. Buenaposada, E. Munoz, and L. Baumela, "Efficiently estimating facial expression and illumination in appearance-based tracking," 2006, p. I:57, incorporated by reference, for face tracking, where the face is represented by the addition of two approximately independent subspaces to describe facial expressions and illumination, respectively.

In N. Costen, T. F. Cootes, G. J. Edwards, and C. J. Taylor, "Automatic extraction of the face identity-subspace.," in *BMVC*, 1999, and N. Costen, T. F. Cootes, G. J. Edwards, and C. J. Taylor, "Simultaneous extraction of functional face subspaces," *CVPR*, vol. 01, pp. 1492, 1999, which are incorporated by reference, facial appearance models of shape and texture are employed and non-orthogonal texture subspaces for lighting, pose, identity, and expression are extracted using appropriate image sets. An iterative expectation-maximization algorithm is then applied in order to maximize the efficiency of facial representation over the added subspaces. The projections on each subspace are then used to recalculate the subspaces. This approach is shown to improve the identity recognition results. It is still desired to have an algorithm that permits less complex handling of illumination changes, and obtaining a general and robust facial appearance model.

PCA-based models generally do not decouple different types of variations. AAM techniques are using PCA, and thus inherit this limitation of being practically incapable of differentiating among various causes of face variability, both in shape and texture. An important drawback of a non-decoupled PCA-based model is that it can introduce non-valid space regions, allowing the generation of non-realistic shape/texture configurations. Moreover, the interpretation of the parameters of the global model can be ambiguous, as there is no clear distinction of the kind of variation they stand for. It is recognized by the inventors that it would be desirable to obtain specialized subspaces, such as an identity subspace and/or a directional lighting subspace.

Changes in lighting or illumination represent one of the most complex and difficult to analyze sources of face variability. Thus it is desired to decouple variations in identity from those caused by directional lighting. It is further desired to split the shape model by decoupling identity from pose or expression. It is recognized by the inventors that decoupling the pose variations from the global shape model can be realized by using a proper training set, in which the individuals are presented in several poses, normally covering a range within 30°-40° for head tilting.

SUMMARY OF THE INVENTION

A technique is provided for determining a characteristic of a face or certain other object within a scene captured in a digital image. A digital image is acquired including a face or certain other object within a scene. A linear texture model is applied that is constructed based on a training data set and that includes a class of objects including a first subset of model components that exhibit a dependency on directional lighting variations and a second subset of model components which are independent of directional lighting variations. An initial location of the face or certain other object in the scene is initially determined. A fit of the model to the face or certain other object is obtained as one or more individual values of one or more of the model components of the linear texture model is/are adjusted. Based on the obtained fit of the model to the face or certain other object in the scene, at least one characteristic of the face or certain other object is determined. A corrected image including the determined characteristic is electronically stored, transmitted, has a face or other object recognition program applied thereto, edited, or displayed, or combinations thereof.

A further technique is provided for adjusting a characteristic of a face or certain other object within a scene captured in a digital image is also provided. A digital image is acquired including a face or certain other object within a scene. A linear texture model is obtained that is constructed based on a training data set and includes a class of objects including a first subset of model components that exhibit a dependency on directional lighting variations and a second subset of model components which are independent of directional lighting variations. An initial location of the face or certain other object in the scene is determined. A fit of the model to the face or certain other object in the scene is obtained as one or more individual values of one or more model components of the linear texture model is/are adjusted. Based on the obtained fit of the model to the face or certain other object in the scene, a characteristic of the face or certain other object is adjusted as one or more values of one or more model components of the linear texture model are changed to generate an adjusted object model. The adjusted object model is superimposed onto the digital image. The method includes electronically storing, transmitting, applying a face recognition program to, editing, or displaying the corrected face image, or combinations thereof.

The model components may include eigenvectors, and the individual values may include eigenvalues of the eigenvectors. The determined characteristic may include a feature that is independent of directional lighting. A reconstructed image without a periodic noise component may be generated.

A second fit may be obtained of the face or certain other object to a second linear texture model that is based on a training data set and that includes a class of objects including a set of model components which lack a periodic noise component. The method may include extracting the periodic noise component including determining a difference between the face or certain other object and the reconstructed image. A frequency of the noise component may be determined, and the periodic noise component of the determined frequency is removed.

An exposure value for the face or certain other object may be determined, as a fit is obtained of the face or certain other object to a second linear texture model that is based on a training data set and that includes a class of objects including a set of model components that exhibit a dependency on exposure value variations. An effect of a background region or density contrast caused by shadow, or both, may be reduced.

The method may include controlling a flash to accurately reflect a lighting condition. A flash control condition may be obtained by referring to a reference table. A flash light emission may be controlled according to the flash control condition. An effect of contrasting density caused by shadow or black compression or white compression or combinations thereof may be reduced.

The method may further include adjusting or determining a sharpness value, or both. A second linear texture model may be obtained that is constructed based on a training data set. The model may include a class of objects including a subset of model components that exhibit a dependency on sharpness variations. A fit of said second model to the face or certain other object in the scene may be obtained and one or more individual values of one or more model components of the second linear texture model may be adjusted. Based on the obtained fit of the second model to the face or certain other object in the scene, a sharpness of the face or certain other object may be adjusted as one or more values of one or more model components of the second linear texture model are changed to generate a further adjusted object model.

The method may include removing a blemish from a face or certain other object. A second linear texture model may be obtained that is constructed based on a training data set and includes a class of objects including a subset of model components that do not include the blemish. A fit of the second model to the face or certain other object in the scene may be obtained as one or more individual values of one or more model components of the second linear texture model are adjusted. Based on the obtained fit of the second model to the face or certain other object in the scene, the blemish is removed from the face or certain other object as one or more values of one or more model components of the second linear texture model are changed to generate a further adjusted object model. The blemish may include an acne blemish or other skin blemish or a photographic artefact.

A graininess value may be adjusted and/or determined. A second linear texture model may be obtained that is constructed based on a training data set and includes a class of objects including a subset of model components that exhibit a dependency on graininess variations. A fit of the second model to the face or certain other object in the scene may be obtained including adjusting one or more individual values of one or more model components of the second linear texture model. Based on the obtained fit of the second model to the face or certain other object in the scene, a graininess of the face or certain other object may be adjusted as one or more values of one or more model components of the second linear texture model are changed to generate a further adjusted object model.

A resolution value may be converted, adjusted and/or determined. A second linear texture model may be obtained that is constructed based on a training data set and includes a class of objects including a subset of model components that exhibit approximately a same resolution as the face or certain other object. A fit of the second model to the face or certain other object in the scene may be obtained as one or more individual values of one or more model components of the second linear texture model are adjusted. Based on the obtained fit of the second model to the face or certain other object in the scene, a resolution of the face or certain other object may be converted as one or more values of one or more model components of the second linear texture model are changed to generate a further adjusted object model.

In the second technique, the adjusting may include changing one or more values of one or more model components of the first subset of model components to a set of mean values, and thereby adjusting directional lighting effects on the scene within the digital image. The first technique may also include the adjusting. The adjusting of directional lighting effects may include increasing or decreasing one or more directional lighting effects. The adjusting may include filtering directional light effects to generate a directional light filtered face image, and a face recognition program may be applied to the filtered face image.

A further method is provided for constructing a linear texture model of a class of objects, including a first subset of model components that exhibit a dependency on directional lighting variations and a second subset of model components that are independent of directional lighting variations. A training set is provided including multiple object images wherein various instances of each object cover a range of directional lighting conditions. The method also includes applying to the images a linear texture model constructed from object images each captured under uniform lighting conditions and forming a uniform lighting subspace (ULS). A set of residual texture components are determined between object images captured under directional lighting conditions and the linear texture model constructed from object images each captured under uniform lighting conditions. An orthogonal texture subspace is determined from residual texture components to form a directional lighting subspace (DLS). The uniform lighting subspace (ULS) is combined with the directional lighting subspace (DLS) to form a new linear texture model.

The method may further include:
(i) applying the new linear texture model that is constructed based on a training data set and comprises a class of objects including a subset of model components that has uniform lighting subspace (ULS) and directional lighting subspace (DLS) components,
(ii) obtaining a fit of said new model to the face or certain other object in the scene including adjusting one or more individual values of one or more model components of the new linear texture model;
(iii) based on the obtained fit of the new model to the face or certain other object in the scene, determining a characteristic of the face or certain other object, and
(iv) electronically storing, transmitting, applying a face or other object recognition program to, editing, or displaying the corrected face image or certain other object including the determined characteristic, or combinations thereof.

The method may further include:
(v) further comprising changing one or more values of one or more model components of the new linear texture model to generate a further adjusted object model;
(vi) obtaining a fit of the new model to the face or certain other object in the scene including adjusting one or more individual values of one or more model components of the new linear texture model; and
(vii) based on the obtained fit of the new model to the face or certain other object in the scene, determining a characteristic of the face or certain other object.

The model components may include eigenvectors, and the individual values may include eigenvalues of the eigenvectors.

A face illumination normalization method is also provided. A digital image is acquired including data corresponding to a face that appears to be illuminated unevenly. Separate sets of directional and uniform illumination classifier programs are applied to the face data. The face data are identified as corresponding to a projection of the face within the digital image on one or a combination of the directional illumination classifier programs plus a constant vector representing the face according to one or a combination of the uniform illumination classifier programs, thereby decomposing the face data into orthogonal subspaces for directional and uniform illumination. An illumination condition may be normalized for the face including setting one or more illumination parameters of the directional illumination projection to zero. The method may further include electronically storing, transmitting, applying a face recognition program to, editing, or displaying the corrected face image, or combinations thereof.

The applying may include projecting the face data onto the uniform lighting classifier program set, and then applying residual data of the face data to the directional lighting classifier program set. A face recognition program may be applied to the normalized face image. A set of feature detector programs may be applied to reject non-face data from being identified as face data. An illumination condition may be determined based on acceptance of the face data by one or a combination of the directional illumination classifier programs.

The digital image may be one of multiple images in a series that include the face. The normalizing may be applied to a different image in the series than the original digital image within which the face data is identified.

A face detection method is also provided. A digital image is acquired, and a sub-window is extracted from the image. Separate sets of two or more shortened face detection classifier cascades are applied. One set is trained to be selectively sensitive to a characteristic of a face region, and another set of face detection classifier cascades are insensitive to the characteristic. The face data are identified as corresponding to a projection of the face within the digital image on one or a combination of the characteristic-sensitive classifier cascades plus a constant vector representing the face according to one or a combination of the characteristic-insensitive classifier cascades, thereby decomposing the face data into orthogonal subspaces for characteristic-sensitive and characteristic-insensitive conditions. Based on the applying and identifying, a probability is determined that a face with a certain form of the characteristic is present within the sub-window. Based on the determining, an extended face detection classifier cascade trained for sensitivity to the form of said characteristic is applied. A final determination that a face exists within the image sub-window is provided. The process is repeated for one or more further sub-windows from the image or one or more further characteristics, or both.

The characteristic or characteristics may include a directional illumination of the face region, an in-plane rotation of the face region, a 3D pose variation of the face region, a degree of smile, a degree of eye-blinking, a degree of eye-winking, a degree of mouth opening, facial blurring, eye-defect, facial shadowing, facial occlusion, facial color, or facial shape, or combinations thereof.

The characteristic may include a directional illumination, and the method may include determining an uneven illumination condition by applying one or more uneven illumination classifier cascades. A front illumination classifier cascade may be applied. An illumination condition of a face within a sub-window may be determined based on acceptance by one of the classifier cascades.

The digital image may be one of multiple images in a series that include the face. The method may include correcting an uneven illumination condition of the face within a different image in the series than the digital image within which the illuminating condition is determined.

The uneven illumination classifier cascades may include a top illumination classifier, a bottom illumination classifier, and one or both of right and left illumination classifiers.

A further face detection method is provided. A digital image is acquired and a sub-window is extracted from the image. Separate sets of two or more shortened face detection classifier cascades are applied. One of the sets is trained to be selectively sensitive to a directional facial illumination, and another set of face detection classifier cascades is insensitive to directional facial illumination. The face data are identified as corresponding to a projection of the face within the digital image on one or a combination of the directional illumination classifier cascades plus a constant vector representing the face according to one or a combination of the directional illumination insensitive classifier cascades, thereby decomposing the face data into orthogonal subspaces for directional and uniform conditions. Based on the applying and identifying, a probability is determined that a face having a certain form of directional facial illumination is present within the sub-window. Based on the determining, an extended face detection classifier cascade trained for sensitivity to the form of directional facial illumination is applied. A final determination is provided that a face exists within the image sub-window. The process is repeated for one or more further sub-windows from the image or one or more further directional facial illuminations, or both.

The digital image may be one of multiple images in a series that include the face. The method may include correcting an uneven illumination condition of the face within a different image in the series than the digital image within which the illuminating condition is determined.

The directional illumination classifier cascades comprise a top illumination classifier, a bottom illumination classifier, and one or both of right and left illumination classifiers.

An illumination condition of a face within a sub-window may be determined based on acceptance by one or a combination of the classifier cascades.

A digital image acquisition device is provided with an optoelectonic system for acquiring a digital image, and a digital memory having stored therein processor-readable code for programming the processor to perform any of the methods described herein.

DETAILED DESCRIPTION OF THE PREFERRED EMBODIMENTS

Figure 1:
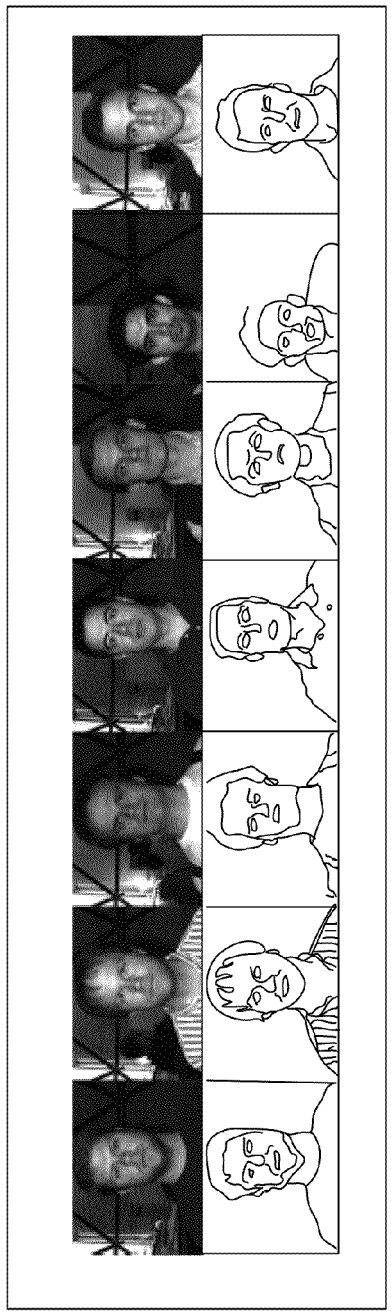
FIGS. 1 and 2 illustrate different individuals at constant frontal illumination based on which a shape model and a texture model may be built.

Techniques are provided below wherein a texture space is decomposed into two orthogonal subspaces, one of uniform illumination and the second for illumination variability. An advantage of this approach is that two separate sets of parameters are used to control variations between individuals and variations in illumination conditions. Another advantage is that an exhaustive image database for training the statistical model is not needed. Statistical appearance models are described briefly, as well as a method for separating directional lighting variation. It is also described how to fuse two separate texture models. Examples of how the model may be fit are also described below and some experimental results are presented.

A linear texture model is constructed wherein the model is decomposed into orthogonal subspaces, one of which describes the model variability to directional changes in lighting conditions. By employing such a model various applications of linear texture models are made robust to variations in directional lighting conditions. Where such models are integrated within an image acquisition appliance such as a digital camera, external processing device, printer, display or other rendering appliance, or computer or other processing appliance, the models may be employed to improve image quality at the time of acquisition.

A linear texture model, specifically an active appearance model (AAM) is trained in a manner which separates the directional lighting variability from a second aspect of the model. The second aspect of the model may now be determined independently of the directional lighting applied to a scene. When incorporated within a digital camera such a model is substantially more robust to lighting variations and provides more acceptable image improvements.

As this describes a technique which can remove "directional lighting variability" from faces, it can be combined with any of a wide various face analysis techniques; such as those described in US published applications nos. 2005/0140801, 2005/0041121, 2006/0204055, 2006/0204110, PCT/US2006/021393, 2006/0120599, 2007/0116379, PCT/US2007/075136, 2007/0116380, 2007/0189748, 2007/0201724, 2007/0110305, and 2007/0160307, and U.S. application Ser. Nos. 11/761,647, 11/462,035, 11/767,412, 11/624,683, 11/753,397, 11/766,674, 11/773,815, 11/773,855, 60/915,669, 60/945,558, and 60/892,881, and U.S. Pat. Nos. 7,315,631, 7,336,821, 6,407,777 and 7,042,511, which are all incorporated by reference.

Techniques are described herein that have reduced complexity and that serve to decompose a linear texture space of a facial appearance model into two (or more) linear subspaces, for example, one for inter-individual variability and another for variations caused by directional changes of the lighting conditions (others may include pose variation and other variables described herein). The approach used is to create one linear subspace from individuals with uniform illumination conditions and then filter a set of images with various directional lighting conditions by projecting corresponding textures on the previously built space. The residues are further used to build a second subspace for directional lighting. The resultant subspaces are orthogonal, so the overall texture model can be obtained by a relatively low complexity concatenation of the two subspaces. An advantage of this representation is that two sets of parameters are used to control inter-individual variation and separately intra-individual variation due to changes in illumination conditions.

Statistical Face Models of Shape and Texture

Shapes are defined as a number of landmarks used to best describe the contour of the object of interest (i.e. the face). A shape vector is given by the concatenated coordinates of all landmark points, as $(x_1, x_2, \ldots, x_L, y_2, y_2, \ldots, y_L)^T$, where L is the number of landmark points.
The shape model is obtained by applying PCA on the set of aligned shapes $$s = \bar{s} + PHI_s b_s \quad (1)$$

where $\bar{s}$ is the mean shape vector, with $N_s$ the number of shape observations; $PHI_s$ is the matrix having as its columns the eigenvectors; $b_s$ defines the set of parameters of the shape model.

Texture, defined as pixel values across an object of interest, may also be statistically modelled. Face patches are first warped into the mean shape based on a triangulation algorithm. Then, a texture vector $(t_1, t_2, \ldots, t_P)^T$ is built for each training image by sampling the values across the warped (shape-normalized) patches, with P being the number of texture samples.

The texture model is also derived by means of PCA on the texture vectors:

$$t = \bar{t} + PHI_t b_t \quad (2)$$

where $\bar{t}$ is the mean texture vector, $N_t$ being the number of texture observations; $PHI_t$ is again the matrix of eigenvectors, and $b_t$ the parameters for the texture model.

Sets of shape and texture parameters $c = (W_s b_s; b_t)$ are used to describe the overall appearance variability of the modelled object, where $W_s$ is a vector of weights used to compensate for the differences in units between shape and texture parameters.

Texture Space Decomposition

Figure 2:
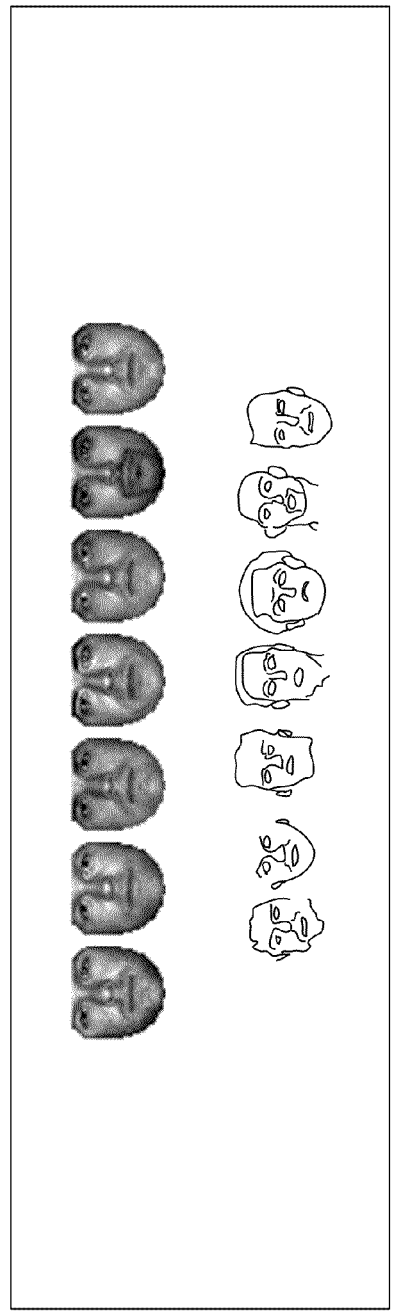

To construct texture models, images from the Yale Face Database B were used (see below, and A. S. Georghiades, P. N. Belhumeur, and D. J. Kriegman, "From few to many: Generative models for recognition under variable pose and illumination," in FG, 2000, pp. 277-284, incorporated by reference). First, a shape model and a texture model are built from different individuals at constant frontal illumination (see FIG. 1 and FIG. 2). The shape and texture models are built as described in formulas (1) and (2), keeping also the same notations. This type of illumination stands as an approximation for uniform illumination conditions. The resultant texture eigenspace is referred to as the Uniform Lighting Subspace (ULS), or uniform illumination subspace, of the individuals.

Figure 3:
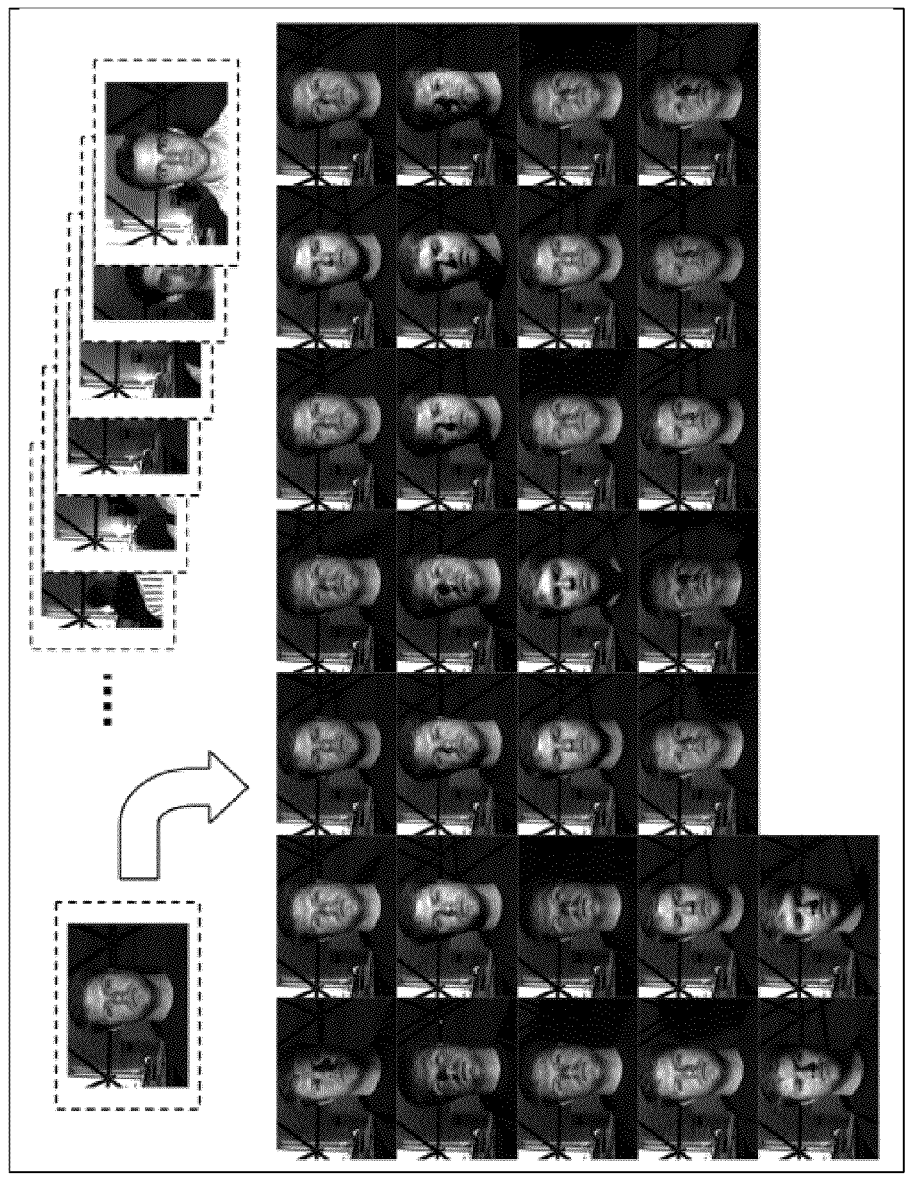
FIG. 3 illustrates images with various directional lighting conditions.
Figure 4:
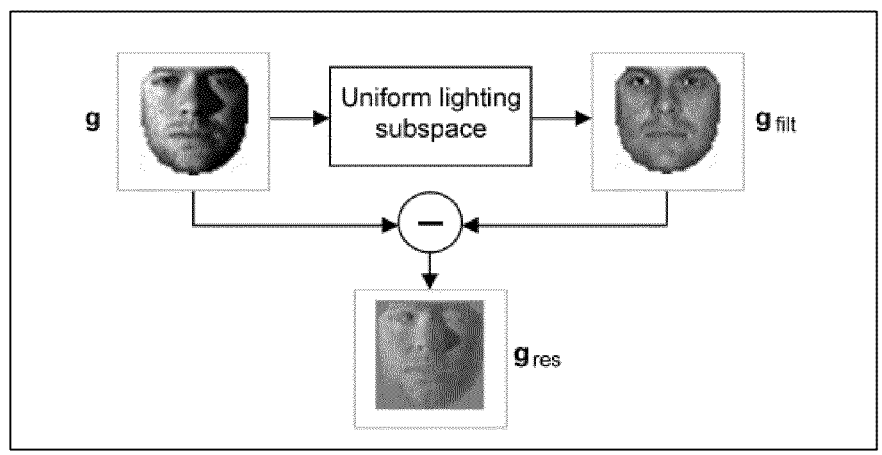
FIG. 4 illustrates obtaining a residual texture $g_{res}$ based on a projection of texture vectors on a uniform lighting (or illumination) subspace.

For each individual, images are now considered with various directional lighting conditions (see FIG. 3). The same reference shape is used to obtain the new texture vectors g, which ensures that the previous and new texture vectors have equal lengths.

These vectors are then filtered by projecting them on ULS (see formulas (3) and (4), below):

$$b_{t\_opt} = PHI_t^T (g - \bar{t}) \quad (3)$$

$$g_{filt} = \bar{t} + PHI_t b_{t\_opt} \quad (4)$$

The residual texture is given by formula (5) below:

$$g_{res} = g - g_{filt} = g - \bar{t} - PHI_t b_{t\_opt} \quad (5)$$

The residues are used to create an orthogonal texture subspace of directional lighting. This may be referred to as a Directional Lighting Subspace (DLS) or directional illumination subspace. The directional lighting texture model is described, similar to formula (2) above, by formula (6) below:

$$g_{res} = \bar{g}_{res} + PHI_g b_g \quad (6)$$

Fusion of Texture Models

DLS is built from the residual (difference) images subsequent to a projection on ULS. Thus, DLS is orthogonal to ULS. The fused texture model is given by formula (7) below:

$$t_{fused} = \bar{t} + PHI_t b_t + PHI_g b_g \quad (7)$$

The fusion between the two texture models may be realized by, for example, a weighted concatenation of parameters. A vector of weighted shape parameters concatenated with the texture parameters is as follows in formula (8):

$$c = (W_s b_s; b_t; W_g b_g) \quad (8)$$

where $W_s$ and $W_g$ are two vectors of weights used to compensate for the differences in units between the two sets of texture parameters, and for the differences in units between shape and texture parameters, respectively.

Model Fitting and Results

The Active Appearance Model (AAM) is a common technique used to optimize parameters of a statistical model of appearance as in G. J. Edwards, C. J. Taylor, and T. F. Cootes, "Interpreting face images using active appearance models," in *Proc. of the 3rd Int. Conf on Automatic Face and Gesture Recognition*, Nara, Japan, incorporated by reference. As demonstrated by A. U. Batur and M. H. Hayes, "Adaptive active appearance models," vol. 14, no. 11, pp. 1707-1721, November 2005, incorporated by reference, the standard AAM algorithm, which uses a gradient estimate built from training images, cannot generally be successfully applied on images when important variations in the illumination conditions are present. This is because the estimated gradient specializes around the mean of the dataset it is built from.

The solution proposed by Batur et al. is based on using an adaptive gradient AAM. The gradient matrix is linearly adapted according to texture composition of the target image, in order to generate a better estimate of the actual gradient. This technique represents a trade-off between using a fixed gradient (AAM) and numerically computing the gradient matrix at each iteration (the standard optimization technique).

Yale Face Database B

To build exemplary statistical models, the standard Yale Face Database B is used and referred to in the examples that follow. The database contains 5760 single light source images of 10 subjects each seen under 576 viewing conditions (9 poses×64 illumination conditions). The images in the database were captured using a purpose-built illumination rig. This rig is fitted with 64 computer controlled strobes. The 64 images of a subject in a particular pose were acquired at camera frame rate (30 frames/second) in about 2 seconds, so there is only small change in head pose and facial expression for those 64 (+1 ambient) images. The acquired images are 8-bit (gray scale) and the size of each image is 640(w)×480 (h).

Being a fairly comprehensive face database from the point of view of the range of directional lighting variations, it may be used for generating a steady directional lighting model. For this purpose, the frontal pose images are generally selected for use under all captured illumination conditions. This model can be further incorporated into a full (lighting-enhanced) face model.

Exemplary Fitting Scheme

A modified AAM-based fitting scheme is adapted for the lighting-enhanced face model described above. Having obtained a model in which there is a clear separation between identity and lighting variation facilitates the design of an AAM-based fitting scheme which could successfully be applied with this particular type of model.

Evaluation is performed of the lighting variations which are present inside a raw texture vector, based on the specialized illumination subspace/model. The illumination model is kept fixed throughout designing and training subsequent models for other types of variations (e.g. an enhanced identity model). This provides that the orthogonality condition and consistency of reference shape used for generating texture vectors are maintained.

Based on a direct projection of the original texture vector onto the illumination subspace, the lighting variations present in the original texture vector are estimated. The nature and extent of lighting variations is encoded in the amplitude of the parameters of the illumination model. The accuracy of this estimation is dependent on the comprehensiveness of the illumination model.

As a separate application, after estimating the lighting parameters, they can be reversed and thus a new texture vector can be generated which theoretically has zero lighting variations (in practice these lighting variations will only be removed to a certain extent).

The standard AAM technique is used now to drive all model parameters other than the lighting parameters. The lighting parameters (obtained by direct projection) are further employed for generating the complete synthetic texture. The modelled texture vector has now incorporated also the lighting variations, being thus adapted to the specific lighting conditions present inside the original image. The resulting error surface is thus compatible with the constant gradient assumption of the AAM fitting technique. This is because the important directional lighting variations, which were practically responsible for the failure of a standard AAM fitting technique, are no longer reflected in the error vector. This step is introduced into the iterative optimisation scheme of a standard AAM.

It was experimentally confirmed that it suffices to have a low dimensional (possibly as low as 3-dimensions) lighting subspace for the proposed scheme to work. The low dimensionality of the lighting subspace ensures that the added computational costs involved (due to the multiple projections) do not affect significantly the overall fitting rate of the face model.

Enhancing the identity model can be realised by creating a more extensive training dataset. In order to insure that the orthogonality condition is still maintained, each new image is first projected on the lighting texture subspace in order to filter out the unwanted variation. The difference images are this time used to re-estimate identity subspace. For that, an iterative algorithm is employed to obtain the new mean of the overall texture model.

Close Initialization Requirement

One weakness of the fitting technique proposed above is the requirement for a more accurate initialization of the model inside the image frame; namely the position and size of the face. The practical solution proposed here is to firstly employ the face detector described in P. A. Viola and M. J. Jones, "Robust real-time face detection." International Journal of Computer Vision, vol. 57, no. 2, pp. 137-154, 2004, incorporated by reference, and then tune its returned estimates of these face localization parameters with the centre of gravity and size of the specific reference shape used with the face model. The Viola-Jones face detector, based on the Ada-Boost algorithm described, for example, in Y. Freund and R. E. Schapire, "A decision-theoretic generalization of on-line learning and an application to boosting," in European Conference on Computational Learning Theory, 1995, pp. 23-37, incorporated by reference, is thus firstly applied to estimate the centre and size of the face. The initialization step of the statistical model inside the image frame is tuned with the face detector using a statistical relationship learned from the training set. A statistical relation between the face detector estimates for the face position and size (rectangle region) and the position and size of the reference shape inside the image frame is initially learnt (offline) from a set of training images. This relation is then used to obtain a more accurate initialization for the reference shape, tuned with the employed face detection algorithm. It is also important to have a reasonably close initialization to the real values in order to insure the convergence of the fitting algorithm.

Extension of the Lighting-Enhanced Model for Colour Images

A notable applicability of the directional lighting sub-model (generated from a greyscale database) is that it can effectively be incorporated into a colour face model. The justification is that, theoretically, directional (white) lighting variations produce changes in the intensity component of a colour image, which is thus a problem that could be dealt with on greyscale. Yet, it is found in practice that, when working with colour images, directional lighting variations affect not only the intensity component but produce similar, although usually less significant effects on the chrominance components as well. Nonetheless, a colour face model designed principally based on the same technique described above for the greyscale, but employing instead colour texture vectors, is proven to offer significant benefits in terms of segmentation accuracy over the standard AAM-based equivalent.

Although more computationally expensive, the standard optimization technique may be used as it also provides enhanced accuracy. A fast optimization algorithm may also be used, wherein the AAM technique is used for optimizing model parameters other than illumination parameters. The model convergence may be applied on a new set of images with some variations of the illumination conditions, although the inventors found in their research no very important differences in the quality of the fit between the fused model and a standard model based on a single texture eigenspace built from the combined set of training images.

An advantage of fitting a fused model is that it offers control on illumination, based on the separate set of illumination parameters. Thus, after fitting the model, one can obtain an estimate of the illumination conditions present, normalize the illumination (e.g. to uniform illumination), or generate different illumination conditions.

Figure 5A:
FIG. 5A illustrates fitting a model in accordance with certain embodiments on a new image in which a spotlight is present at a person's left side.
Figure 5B:
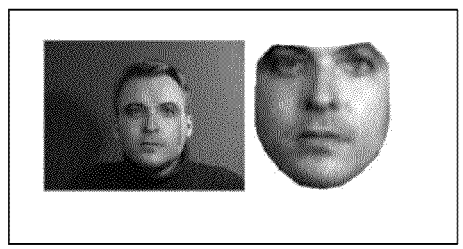
FIG. 5B illustrates a face patch that is correctly segmented, but wherein the person's identity is not so accurately reproduced in the synthesized image.
Figure 5C:
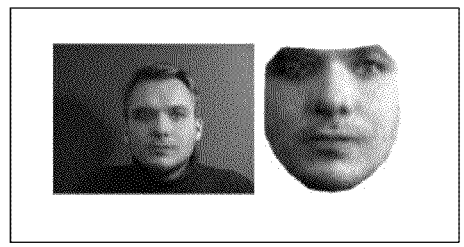
FIG. 5C illustrates the extraction of real texture of an original image from inside a fitted shape.
Figure 5D:
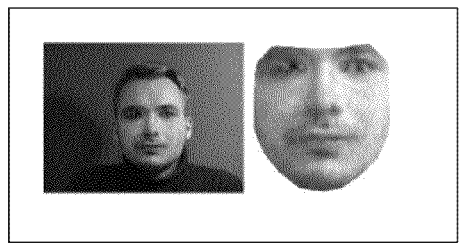
FIG. 5D illustrates results for setting the parameters to zero and obtaining illumination normalization.

In FIGS. 5A-5D, an example is illustrated where a model as described herein is fit on a new image in which a spotlight is present at the person's left side as in FIG. 5A. As it can be seen from FIG. 5B, the face patch is correctly segmented, yet the person's identity is not so accurately reproduced in the synthesized image. This is due to the limitations of the ULS model which was built using a small number of observations. Yet one can now extract the real texture of the original image from inside the fitted shape as illustrated at FIG. 5C. The real texture vector can be viewed as the projection of the individual on the directional lighting eigenspace plus a constant vector representing the individual under uniform lighting. This can be written as in formula (9) below:

$$t_{real} = t_{unif} + PHI_g b_{g\_opt} \quad (9)$$

where $b_{g\_opt}$ are the illumination parameters which were estimated during the overall optimization stage. By altering $b_{g\_opt}$ new illuminations can be generated. FIG. 5D shows the results for setting all parameters to zero and obtaining illumination normalization.

A statistical face model based on texture space decomposition as has been described enables the separation of illumination variability and intra-individual variability. The model is useful in applications where the control over the illumination conditions is desired. The separation of the sets of parameters is also useful when it is not desirable to maintain an exhaustive image database for all the modelled components. Thus, an appropriate (separate) database can be used for modelling components like shape (including pose) variability, inter-individuals variability, and/or directional lighting. An improved shape model, designed to include also pose variability, can also be used to further enhance the capabilities of the overall appearance model.

The technique can also be extended to color images using a color training database for modelling individual variability under uniform lighting. Advantageous models provided herein offer solutions in applications like face recognition and/or face tracking for dealing with variations in pose and/or illumination conditions, where many of the current techniques still show weak points.

ALTERNATIVE EMBODIMENTS

In-camera and external image processing applications may be combined with features provided herein in further embodiments. In an image processing embodiment, features of a linear texture or AAM model as described above or elsewhere herein are enhanced in combination with a program that accurately removes unnecessary periodic noise components from an image (see US published patent application no. 2006/0257047, incorporated by reference). A reconstruction unit may generate a reconstructed image without a periodic noise component by fitting to a face region detected in an image by a face detection unit a mathematical model generated according a method of AAM using a plurality of sample images representing human faces without a periodic noise component. The periodic noise component may be extracted by a difference between the face region and the reconstructed image, and a frequency of the noise component may be determined. The noise component of the determined frequency may then be removed from the image.

A further embodiment relating to photography and photography programs includes a program which determines an exposure value based on a face region with high accuracy and with less effect of a background region or density contrast caused by shadow (see US published patent application no. 2006/0268150, incorporated by reference). A face detection unit may be used to detect a face region from a face candidate region by fitting to the face candidate region a mathematical model generated by a method of AAM using a plurality of sample images representing human faces. An exposure value determination unit may then determine an exposure value for photography based on the face region.

A further embodiment relating to photography includes a program wherein an auxiliary light source such as a flash is controlled for highly accurately reflecting a lighting condition with less effect of a factor other than the lighting condition such as contrasting density caused by shadow or black compression or white compression (see US published patent application no. 2006/0269270, incorporated by reference). In this embodiment, a parameter acquisition unit obtains weighting parameters for principal components representing lighting conditions in a face region in an image detected by a face detection unit by fitting to the detected face region a mathematical model generated according to a method of AAM using a plurality of sample images representing human faces in different lighting conditions. A flash control unit may obtain a flash control condition by referring to a reference table according to the parameters, and may control flash light emission according to the control condition.

Another embodiment involves image processing and includes a program wherein sharpness is adjusted for enhanced representation of a predetermined structure in an image. A parameter acquisition unit may obtain a weighting parameter for a principal component representing a degree of sharpness in a face region detected by a face detection unit as an example of the predetermined structure in the image by fitting to the face region a mathematical model generated by a statistical method such as AAM based on a plurality of sample images representing human faces in different degrees of sharpness (see US published patent application no. 2007/0070440, incorporated by reference). Based on a value of the parameter, sharpness may be adjusted in at least a part of the image. For example, a parameter changing unit may change the value of the parameter to a preset optimal face sharpness value, and an image reconstruction unit may reconstruct the image based on the parameter having been changed and may output the image having been subjected to the sharpness adjustment processing.

A further embodiment involves removal of an unnecessary or undesirable blemish in a digital image, such as an acne blemish or a dust artefact, i.e., a blemish caused by the presence of dust in the air or on an optical surface between the object and the image sensor. The blemish may be removed completely from a predetermined structure such as a face in a photograph image without manual operation and skills (see US published patent applications 2005/0068452 and 2007/0071347, incorporated by reference). A blemish removal unit may be fit to a face region as the structure in the image. A mathematical model may be generated according to a statistical method such as AAM using sample images representing the structure without the component to be removed, and an image reconstruction unit may reconstruct an image of the face region based on parameters corresponding to the face region obtained by the fitting of the model. An image may be generated by replacing the face region with the reconstructed image. Since the mathematical model has been generated from the sample images of human faces without blemishes caused by dust or acne, the model does not include such blemishes. Therefore, the reconstructed face image generated by fitting the model to the face region does not include such blemishes.

In another image processing embodiment, features of a linear texture or AAM model as described above or elsewhere herein are enhanced in combination with a program that reduces graininess with accuracy by finding a degree of graininess in an image (US published patent application no. 2006/0291739, incorporated by reference). A parameter acquisition unit may obtain a weighting parameter for a principal component representing a degree of graininess in a face region found in the image by a face detection unit by fitting to the face region a mathematical model generated by a method of AAM using a plurality of sample images representing human faces in different degrees of graininess. A parameter changing unit may change the parameter to have a desired value. A graininess reduction unit reduces graininess of the face region according to the parameter having been changed.

Another embodiment includes a combination of one or more features of a linear texture or AAM model as described above or elsewhere herein with a program that converts the resolution of an input image using a certain AAM method (see US published patent application no. 2006/0280380, incorporated by reference). A resolution conversion unit is described for converting a resolution of an image having been subjected to correction. A face detection unit is described for detecting a face region in the resolution-converted image. A reconstruction unit fits to the face region detected by the face detection unit a mathematical model generated through the method of AAM using sample images representing human faces having the same resolution as the image, and reconstructs an image representing the face region after the fitting. In this manner, an image whose resolution has been converted is obtained.

In addition the invention may be applied as a pre-processing step to a face recognition system. In such an embodiment face regions are detected within an acquired image using techniques such as may be described in U.S. Pat. No. 7,315,631, incorporated by reference. One or more AAM models are also applied to the determined face region when these techniques are used.

In one embodiment the model components which are members of the directional lighting dependent subspace are simply discarded leaving the lighting independent components. Face recognition is then performed on these filtered components. Naturally the face recognizer is initially trained on a database of similarly filtered images. This technique may be applied to most known face recognition techniques including, DCT, PCA, GMM and HMM based face recognizers.

In an alternative embodiment, the directional lighting dependent parameters are adjusted to a set of mean values and a modified face region is created. This modified face region is then passed to a face recognition engine.

A corresponding separation of pose variation into an orthogonal subspace is also achieved in accordance with another embodiment. This enables a similar separation of facial pose and other model characteristics. Thus a corresponding set of AAM models which describe variations in some characteristic(s) of a face region in a pose-independent manner are provided in this embodiment.

These models can be combined with the illumination independent models, as described above for example.

In one embodiment, a first AAM model is applied wherein one or more pose-dependent parameters are adjusted to a set of mean values and a modified face region is created. A second AAM model is applied wherein one or more directional lighting dependent parameters are adjusted to a set of mean values and a second modified face region is created. This modified face region is then provided to a frontal face recognizer.

All references cited herein, in addition to that which is described as background, the invention summary, the abstract, the brief description of the drawings and the drawings, are hereby incorporated by reference into the detailed description of the preferred embodiments as disclosing alternative embodiments.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to the claims below and/or preferred embodiments herein, the operations have been described in selected typographical sequences. However, the sequences have been selected and so ordered for typographical convenience and are not intended to imply any particular order for performing the operations, unless a particular ordering is expressly provided or understood by those skilled in the art as being necessary.

What is claimed is:

1. A method of determining a characteristic of a face or certain other object within a scene captured in a digital image, comprising:
   (a) acquiring a digital image including a face or certain other object within a scene;
   (b) applying a linear texture model that is constructed based on a training data set and that comprises a combination of orthogonal directional and directionally-independent subspaces respectively constructed from a class of objects including a first subset of model components that exhibit a dependency on directional lighting variations and a second subset of model components which are independent of directional lighting variations;
   (c) determining an initial location of the face or certain other object in the scene;
   (d) obtaining a fit of said model to said face or certain other object including adjusting one or more individual values of one or more of the model components of said linear texture model;
   (e) based on the obtained fit of the model to said face or certain other object in the scene, determining at least one characteristic of the face or certain other object; and
   (f) electronically storing, transmitting, applying a face or other object recognition program to, editing, or displaying the corrected face image or certain other object including the determined characteristic, or combinations thereof.

2. The method of claim 1, wherein the model components comprise eigenvectors, and the individual values comprises eigenvalues of the eigenvectors.

3. The method of claim 1, wherein the at least one determined characteristic comprises a feature that is independent of directional lighting.

4. The method of claim 1, further comprising generating a reconstructed image without a periodic noise component, including obtaining a second fit of the face or certain other object to a second linear texture model that is based on a training data set and that comprises a class of objects including a set of model components which are without a periodic noise component.

5. The method of claim 4, further comprising:
(i) extracting the periodic noise component including determining a difference between the face or certain other object and the reconstructed image, and
(ii) determining a frequency of the noise component; and
(iii) removing the periodic noise component of the determined frequency.

6. The method of claim 1, further comprising determining an exposure value for the face or certain other object, including obtaining a fit to the face or certain other object to a second linear texture model that is based on a training data set and that comprises a class of objects including a set of model components that exhibit a dependency on exposure value variations.

7. The method of claim 6, further comprising including reducing an effect of a background region or density contrast caused by shadow or both.

8. The method of claim 1, further comprising controlling a flash to accurately reflect a lighting condition, including obtaining a flash control condition by referring to a reference table and controlling a flash light emission according to the flash control condition.

9. The method of claim 8, further comprising reducing an effect of contrasting density caused by shadow or black compression or white compression or combinations thereof.

10. The method of claim 1, further comprising adjusting or determining a sharpness value, or both, including:
(i) applying a second linear texture model that is constructed based on a training data set and comprises a class of objects including a subset of model components that exhibit a dependency on sharpness variations,
(ii) obtaining a fit of said second model to said face or certain other object in the scene including adjusting one or more individual values of one or more model components of said second linear texture model; and
(e) based on the obtained fit of the second model to said face or certain other object in the scene, adjusting a sharpness of the face or certain other object including changing one or more values of one or more model components of the second linear texture model to generate a further adjusted object model.

11. The method of claim 1, further comprising removing a blemish from a face or certain other object, including:
(i) applying a second linear texture model that is constructed based on a training data set and comprises a class of objects including a subset of model components that do not include such a blemish;
(ii) obtaining a fit of said second model to said face or certain other object in the scene including adjusting one or more individual values of one or more model components of said second linear texture model; and
(e) based on the obtained fit of the second model to said face or certain other object in the scene, removing the blemish from the face or certain other object including changing one or more values of one or more model components of the second linear texture model to generate a further adjusted object model.

12. The method of claim 11, wherein the blemish comprises an acne blemish or other skin blemish.

13. The method of claim 11, wherein the blemish comprises a photographic artefact.

14. The method of claim 1, further comprising adjusting or determining a graininess value, or both, including:
(i) applying a second linear texture model that is constructed based on a training data set and comprises a class of objects including a subset of model components that exhibit a dependency on graininess variations,
(ii) obtaining a fit of said second model to said face or certain other object in the scene including adjusting one or more individual values of one or more model components of said second linear texture model; and
(e) based on the obtained fit of the second model to said face or certain other object in the scene, adjusting a graininess of the face or certain other object including changing one or more values of one or more model components of the second linear texture model to generate a further adjusted object model.

15. The method of claim 1, further comprising converting, adjusting or determining a resolution value, or combinations thereof, including:
(i) applying a second linear texture model that is constructed based on a training data set and comprises a class of objects including a subset of model components that exhibit approximately a same resolution as said face or certain other object,
(ii) obtaining a fit of said second model to said face or certain other object in the scene including adjusting one or more individual values of one or more model components of said second linear texture model; and
(e) based on the obtained fit of the second model to said face or certain other object in the scene, converting a resolution of the face or certain other object including changing one or more values of one or more model components of the second linear texture model to generate a further adjusted object model.

16. A method of adjusting a characteristic of a face or certain other object within a scene captured in a digital image, comprising:
(a) acquiring a digital image including a face or certain other object within a scene;
(b) applying a linear texture model that is constructed based on a training data set and comprises a combination of orthogonal directional and directionally-independent subspaces respectively constructed from a class of objects including a first subset of model components that exhibit a dependency on directional lighting variations and a second subset of model components which are independent of directional lighting variations;
(c) determining an initial location of the face or certain other object in the scene;
(d) obtaining a fit of said model to said face or certain other object in the scene including adjusting one or more individual values of one or more model components of said linear texture model; and
(e) based on the obtained fit of the model to said face or certain other object in the scene, adjusting at least one characteristic of the face or certain other object including changing one or more values of one or more model components of the linear texture model to generate an adjusted object model;
(f) superimposing the adjusted object model onto said digital image; and
(g) electronically storing, transmitting, applying a face recognition program to, editing, or displaying the corrected face image, or combinations thereof.

17. The method of claim 16, wherein the model components comprise eigenvectors, and the individual values comprises eigenvalues of the eigenvectors.

18. The method of claim 16, wherein the at least one determined characteristic comprises a feature that is independent of directional lighting.

19. The method of claim 16, further comprising generating a reconstructed image without a periodic noise component, including obtaining a second fit of the face or certain other object to a second linear texture model that is based on a training data set and that comprises a class of objects including a set of model components which are without a periodic noise component.

20. The method of claim 19, further comprising:
(i) extracting the periodic noise component including determining a difference between the face or certain other object and the reconstructed image, and
(ii) determining a frequency of the noise component; and
(iii) removing the periodic noise component of the determined frequency.

21. The method of claim 16, further comprising determining an exposure value for the face or certain other object, including obtaining a fit to the face or certain other object to a second linear texture model that is based on a training data set and that comprises a class of objects including a set of model components that exhibit a dependency on exposure value variations.

22. The method of claim 21, further comprising including reducing an effect of a background region or density contrast caused by shadow or both.

23. The method of claim 16, further comprising controlling a flash to accurately reflect a lighting condition, including obtaining a flash control condition by referring to a reference table and controlling a flash light emission according to the flash control condition.

24. The method of claim 23, further comprising reducing an effect of contrasting density caused by shadow or black compression or white compression or combinations thereof.

25. The method of claim 16, further comprising adjusting or determining a sharpness value, or both, including:
(i) applying a second linear texture model that is constructed based on a training data set and comprises a class of objects including a subset of model components that exhibit a dependency on sharpness variations,
(ii) obtaining a fit of said second model to said face or certain other object in the scene including adjusting one or more individual values of one or more model components of said second linear texture model; and
(e) based on the obtained fit of the second model to said face or certain other object in the scene, adjusting a sharpness of the face or certain other object including changing one or more values of one or more model components of the second linear texture model to generate a further adjusted object model.

26. The method of claim 16, further comprising removing a blemish from a face or certain other object, including:
(i) applying a second linear texture model that is constructed based on a training data set and comprises a class of objects including a subset of model components that do not include such a blemish;
(ii) obtaining a fit of said second model to said face or certain other object in the scene including adjusting one or more individual values of one or more model components of said second linear texture model; and
(e) based on the obtained fit of the second model to said face or certain other object in the scene, removing the blemish from the face or certain other object including changing one or more values of one or more model components of the second linear texture model to generate a further adjusted object model.

27. The method of claim 26, wherein the blemish comprises an acne blemish or other skin blemish.

28. The method of claim 26, wherein the blemish comprises a photographic artefact.

29. The method of claim 16, further comprising adjusting or determining a graininess value, or both, including:
(i) applying a second linear texture model that is constructed based on a training data set and comprises a class of objects including a subset of model components that exhibit a dependency on graininess variations,
(ii) obtaining a fit of said second model to said face or certain other object in the scene including adjusting one or more individual values of one or more model components of said second linear texture model; and
(e) based on the obtained fit of the second model to said face or certain other object in the scene, adjusting a graininess of the face or certain other object including changing one or more values of one or more model components of the second linear texture model to generate a further adjusted object model.

30. The method of claim 16, further comprising converting, adjusting or determining a resolution value, or combinations thereof, including:
(i) applying a second linear texture model that is constructed based on a training data set and comprises a class of objects including a subset of model components that exhibit approximately a same resolution as said face or certain other object,
(ii) obtaining a fit of said second model to said face or certain other object in the scene including adjusting one or more individual values of one or more model components of said second linear texture model; and
(e) based on the obtained fit of the second model to said face or certain other object in the scene, converting a resolution of the face or certain other object including changing one or more values of one or more model components of the second linear texture model to generate a further adjusted object model.

31. The method of claim 16, wherein the adjusting comprises changing one or more values of one or more model components of said first subset of model components to a set of mean values, and thereby adjusting directional lighting effects on the scene within the digital image.

32. The method of claim 31, wherein the adjusting of directional lighting effects comprises increasing one or more directional lighting effects.

33. The method of claim 31, wherein the adjusting of directional lighting effect comprises decreasing one or more directional lighting effects.

34. The method of claim 16, wherein the face or certain other object comprises a face, and the adjusting comprises filtering directional light effects to generate a directional light filtered face image, and the method further comprises applying a face recognition program to the filtered face image.

35. A digital image acquisition device including an optoelectronic system for acquiring a digital image, and a digital memory having stored therein processor-readable code for programming the processor to perform a method of determining a characteristic of a face or certain other object within a scene captured in a digital image, wherein the method comprises:
(a) acquiring a digital image including a face or certain other object within a scene;

(b) applying a linear texture model that is constructed based on a training data set and that comprises a combination of orthogonal directional and directionally-independent subspaces respectively constructed from a class of objects including a first subset of model components that exhibit a dependency on directional lighting variations and a second subset of model components which are independent of directional lighting variations;

(c) determining an initial location of the face or certain other object in the scene;

(d) obtaining a fit of said model to said face or certain other object including adjusting one or more individual values of one or more of the model components of said linear texture model;

(e) based on the obtained fit of the model to said face or certain other object in the scene, determining at least one characteristic of the face or certain other object; and (f) electronically storing, transmitting, applying a face or other object recognition program to, editing, or displaying the corrected face image or certain other object including the determined characteristic, or combinations thereof.

36. The device of claim 35, wherein the model components comprise eigenvectors, and the individual values comprises eigenvalues of the eigenvectors.

37. The device of claim 35, wherein the at least one determined characteristic comprises a feature that is independent of directional lighting.

38. The device of claim 35, wherein the method further comprises generating a reconstructed image without a periodic noise component, including obtaining a second fit of the face or certain other object to a second linear texture model that is based on a training data set and that comprises a class of objects including a set of model components which are without a periodic noise component.

39. The device of claim 38, wherein the method further comprises:
(i) extracting the periodic noise component including determining a difference between the face or certain other object and the reconstructed image, and
(ii) determining a frequency of the noise component; and
(iii) removing the periodic noise component of the determined frequency.

40. The device of claim 35, wherein the method further comprises determining an exposure value for the face or certain other object, including obtaining a fit to the face or certain other object to a second linear texture model that is based on a training data set and that comprises a class of objects including a set of model components that exhibit a dependency on exposure value variations.

41. The device of claim 40, wherein the method further comprises including reducing an effect of a background region or density contrast caused by shadow or both.

42. The device of claim 35, wherein the method further comprises controlling a flash to accurately reflect a lighting condition, including obtaining a flash control condition by referring to a reference table and controlling a flash light emission according to the flash control condition.

43. The device of claim 42, wherein the method further comprises reducing an effect of contrasting density caused by shadow or black compression or white compression or combinations thereof.

44. The device of claim 35, wherein the method further comprises adjusting or determining a sharpness value, or both, including:
(i) applying a second linear texture model that is constructed based on a training data set and comprises a class of objects including a subset of model components that exhibit a dependency on sharpness variations,
(ii) obtaining a fit of said second model to said face or certain other object in the scene including adjusting one or more individual values of one or more model components of said second linear texture model; and
(e) based on the obtained fit of the second model to said face or certain other object in the scene, adjusting a sharpness of the face or certain other object including changing one or more values of one or more model components of the second linear texture model to generate a further adjusted object model.

45. The device of claim 35, wherein the method further comprises removing a blemish from a face or certain other object, including:
(i) applying a second linear texture model that is constructed based on a training data set and comprises a class of objects including a subset of model components that do not include such a blemish;
(ii) obtaining a fit of said second model to said face or certain other object in the scene including adjusting one or more individual values of one or more model components of said second linear texture model; and
(e) based on the obtained fit of the second model to said face or certain other object in the scene, removing the blemish from the face or certain other object including changing one or more values of one or more model components of the second linear texture model to generate a further adjusted object model.

46. The device of claim 45, wherein the blemish comprises an acne blemish or other skin blemish.

47. The device of claim 45, wherein the blemish comprises a photographic artefact.

48. The device of claim 35, wherein the method further comprises adjusting or determining a graininess value, or both, including:
(i) applying a second linear texture model that is constructed based on a training data set and comprises a class of objects including a subset of model components that exhibit a dependency on graininess variations,
(ii) obtaining a fit of said second model to said face or certain other object in the scene including adjusting one or more individual values of one or more model components of said second linear texture model; and
(e) based on the obtained fit of the second model to said face or certain other object in the scene, adjusting a graininess of the face or certain other object including changing one or more values of one or more model components of the second linear texture model to generate a further adjusted object model.

49. The device of claim 35, wherein the method further comprises converting, adjusting or determining a resolution value, or combinations thereof, including:
(i) applying a second linear texture model that is constructed based on a training data set and comprises a class of objects including a subset of model components that exhibit approximately a same resolution as said face or certain other object,
(ii) obtaining a fit of said second model to said face or certain other object in the scene including adjusting one or more individual values of one or more model components of said second linear texture model; and
(e) based on the obtained fit of the second model to said face or certain other object in the scene, converting a resolution of the face or certain other object including changing one or more values of one or more model components of the second linear texture model to generate a further adjusted object model.

50. A digital image acquisition device including an optoelectonic system for acquiring a digital image, and a digital memory having stored therein processor-readable code for programming the processor to perform a method of adjusting a characteristic of a face or certain other object within a scene captured in a digital image, wherein the method comprises:
  (a) acquiring a digital image including a face or certain other object within a scene;
  (b) applying a linear texture model that is constructed based on a training data set and comprises a combination of orthogonal directional and directionally-independent subspaces respectively constructed from a class of objects including a first subset of model components that exhibit a dependency on directional lighting variations and a second subset of model components which are independent of directional lighting variations;
  (c) determining an initial location of the face or certain other object in the scene;
  (d) obtaining a fit of said model to said face or certain other object in the scene including adjusting one or more individual values of one or more model components of said linear texture model; and
  (e) based on the obtained fit of the model to said face or certain other object in the scene, adjusting at least one characteristic of the face or certain other object including changing one or more values of one or more model components of the linear texture model to generate an adjusted object model;
  (f) superimposing the adjusted object model onto said digital image; and
  (g) electronically storing, transmitting, applying a face recognition program to, editing, or displaying the corrected face image, or combinations thereof.

51. The device of claim 50, wherein the model components comprise eigenvectors, and the individual values comprises eigenvalues of the eigenvectors.

52. The device of claim 50, wherein the at least one determined characteristic comprises a feature that is independent of directional lighting.

53. The device of claim 50, wherein the method further comprises generating a reconstructed image without a periodic noise component, including obtaining a second fit of the face or certain other object to a second linear texture model that is based on a training data set and that comprises a class of objects including a set of model components which are without a periodic noise component.

54. The device of claim 53, wherein the method further comprises:
  (i) extracting the periodic noise component including determining a difference between the face or certain other object and the reconstructed image, and
  (ii) determining a frequency of the noise component; and
  (iii) removing the periodic noise component of the determined frequency.

55. The device of claim 50, wherein the method further comprises determining an exposure value for the face or certain other object, including obtaining a fit to the face or certain other object to a second linear texture model that is based on a training data set and that comprises a class of objects including a set of model components that exhibit a dependency on exposure value variations.

56. The device of claim 55, wherein the method further comprises including reducing an effect of a background region or density contrast caused by shadow or both.

57. The device of claim 50, wherein the method further comprises controlling a flash to accurately reflect a lighting condition, including obtaining a flash control condition by referring to a reference table and controlling a flash light emission according to the flash control condition.

58. The device of claim 57, wherein the method further comprises reducing an effect of contrasting density caused by shadow or black compression or white compression or combinations thereof.

59. The device of claim 50, wherein the method further comprises adjusting or determining a sharpness value, or both, including:
  (i) applying a second linear texture model that is constructed based on a training data set and comprises a class of objects including a subset of model components that exhibit a dependency on sharpness variations,
  (ii) obtaining a fit of said second model to said face or certain other object in the scene including adjusting one or more individual values of one or more model components of said second linear texture model; and
  (e) based on the obtained fit of the second model to said face or certain other object in the scene, adjusting a sharpness of the face or certain other object including changing one or more values of one or more model components of the second linear texture model to generate a further adjusted object model.

60. The device of claim 50, wherein the method further comprises removing a blemish from a face or certain other object, including:
  (i) applying a second linear texture model that is constructed based on a training data set and comprises a class of objects including a subset of model components that do not include such a blemish;
  (ii) obtaining a fit of said second model to said face or certain other object in the scene including adjusting one or more individual values of one or more model components of said second linear texture model; and
  (e) based on the obtained fit of the second model to said face or certain other object in the scene, removing the blemish from the face or certain other object including changing one or more values of one or more model components of the second linear texture model to generate a further adjusted object model.

61. The device of claim 60, wherein the blemish comprises an acne blemish or other skin blemish.

62. The device of claim 60, wherein the blemish comprises a photographic artefact.

63. The device of claim 50, wherein the method further comprises adjusting or determining a graininess value, or both, including:
  (i) applying a second linear texture model that is constructed based on a training data set and comprises a class of objects including a subset of model components that exhibit a dependency on graininess variations,
  (ii) obtaining a fit of said second model to said face or certain other object in the scene including adjusting one or more individual values of one or more model components of said second linear texture model; and
  (e) based on the obtained fit of the second model to said face or certain other object in the scene, adjusting a graininess of the face or certain other object including changing one or more values of one or more model components of the second linear texture model to generate a further adjusted object model.

64. The device of claim 50, wherein the method further comprises converting, adjusting or determining a resolution value, or combinations thereof, including:

(i) applying a second linear texture model that is constructed based on a training data set and comprises a class of objects including a subset of model components that exhibit approximately a same resolution as said face or certain other object, (ii) obtaining a fit of said second model to said face or certain other object in the scene including adjusting one or more individual values of one or more model components of said second linear texture model; and (e) based on the obtained fit of the second model to said face or certain other object in the scene, converting a resolution of the face or certain other object including changing one or more values of one or more model components of the second linear texture model to generate a further adjusted object model.

65. The device of claim 50, wherein the adjusting comprises changing one or more values of one or more model components of said first subset of model components to a set of mean values, and thereby adjusting directional lighting effects on the scene within the digital image.

66. The device of claim 65, wherein the adjusting of directional lighting effects comprises increasing one or more directional lighting effects.

67. The device of claim 65, wherein the adjusting of directional lighting effect comprises decreasing one or more directional lighting effects.

68. The device of claim 50, wherein the face or certain other object comprises a face, and the adjusting comprises filtering directional light effects to generate a directional light filtered face image, and the method further comprises applying a face recognition program to the filtered face image.

* * * * *